(12) United States Patent
Kellerer et al.

(10) Patent No.: US 7,656,815 B2
(45) Date of Patent: Feb. 2, 2010

(54) APPARATUS AND METHOD FOR CONTROLLING AN OPERATION OF A PLURALITY OF COMMUNICATION LAYERS IN A LAYERED COMMUNICATION SCENARIO

(76) Inventors: Wolfgang Kellerer, Stockmeierweg 2, 82256 Fuerstenfeldbruck (DE); Eckehard Steinbach, Adalbert-Stifter-Weg 5, 82140 Olching (DE); Lai-U Choi, Else-Rosenfeld-Str., 23, 81673 Munich (DE)

( * ) Notice: Subject to any disclaimer, the term of this patent is extended or adjusted under 35 U.S.C. 154(b) by 441 days.

(21) Appl. No.: 11/404,533

(22) Filed: Apr. 14, 2006

(65) Prior Publication Data

US 2006/0268933 A1  Nov. 30, 2006

Related U.S. Application Data

(63) Continuation of application No. PCT/EP03/11441, filed on Oct. 15, 2003.

(51) Int. Cl.
*H04J 3/16* (2006.01)
(52) U.S. Cl. .................. 370/252; 370/329; 370/469; 709/227; 709/228
(58) Field of Classification Search .............. 370/469; 709/227
See application file for complete search history.

(56) References Cited

U.S. PATENT DOCUMENTS

| | | | | |
|---|---|---|---|---|
| 5,790,553 | A * | 8/1998 | Deaton et al. | 370/466 |
| 6,515,972 | B1 * | 2/2003 | Gage et al. | 370/328 |
| 6,651,117 | B1 * | 11/2003 | Wilson et al. | 710/33 |
| 6,757,297 | B1 * | 6/2004 | Chin | 370/469 |

(Continued)

FOREIGN PATENT DOCUMENTS

JP  2003-519959  6/2003

(Continued)

OTHER PUBLICATIONS

Office Action issued in connection with corresponding Japanese Patent Application No. 2005-509810, issued on Nov. 19, 2008.

(Continued)

*Primary Examiner*—Seema S Rao
*Assistant Examiner*—Steven Wood
(74) *Attorney, Agent, or Firm*—Nutter McClennen & Fish LLP; John J. Penny, Jr.

(57) ABSTRACT

An apparatus for controlling an operation of a layered communication system, the layered communication system transmitting information through a communication channel, has a provider for providing a property of the communication channel, an extractor for extracting a first set of parameters of a first communication layer and a second set of parameters of a second communication layer to determine current statuses of the first and second communication layer, a provider for providing a first abstraction model and a second abstraction model, wherein each abstraction model models a characteristic of the first and second communication layers, respectively, a determiner for determining an optimized set of parameters to be used by each of the first and second communication layers based on the first and second abstraction models, the channel property and an optimization goal, a provider for providing the optimized sets of parameters to the first and second communication layers.

27 Claims, 10 Drawing Sheets

U.S. PATENT DOCUMENTS

| | | | | |
|---|---|---|---|---|
| 6,785,227 | B1* | 8/2004 | Lu et al. | 370/229 |
| 7,016,668 | B2* | 3/2006 | Vaidyanathan et al. | 455/418 |
| 7,162,722 | B1* | 1/2007 | Supinski et al. | 719/310 |
| 7,218,645 | B2* | 5/2007 | Lotter et al. | 370/469 |
| 7,366,133 | B1* | 4/2008 | Majidi-Ahy et al. | 370/329 |
| 7,404,074 | B2* | 7/2008 | Murotake | 713/100 |
| 2002/0004827 | A1* | 1/2002 | Ciscon et al. | 709/223 |
| 2003/0067907 | A1* | 4/2003 | Rezaiifar et al. | 370/349 |
| 2003/0076810 | A1* | 4/2003 | Rezaiifar et al. | 370/349 |
| 2003/0081580 | A1* | 5/2003 | Vaidyanathan et al. | 370/338 |
| 2003/0174731 | A1* | 9/2003 | Tafazolli et al. | 370/469 |
| 2003/0219034 | A1* | 11/2003 | Lotter et al. | 370/469 |
| 2004/0032835 | A1* | 2/2004 | Majidi-Ahy et al. | 370/252 |
| 2004/0202197 | A1* | 10/2004 | Gao et al. | 370/469 |
| 2005/0152280 | A1* | 7/2005 | Pollin et al. | 370/252 |
| 2006/0015674 | A1* | 1/2006 | Murotake | 711/101 |
| 2006/0114836 | A1* | 6/2006 | Pollin et al. | 370/252 |
| 2006/0146831 | A1* | 7/2006 | Argyropoulos et al. | 370/394 |
| 2006/0171364 | A1* | 8/2006 | Bosch et al. | 370/338 |
| 2006/0259627 | A1* | 11/2006 | Kellerer et al. | 709/227 |
| 2006/0268933 | A1* | 11/2006 | Kellerer et al. | 370/469 |

FOREIGN PATENT DOCUMENTS

| | | |
|---|---|---|
| WO | WO-01/50669 | 7/2001 |

OTHER PUBLICATIONS

Inamura, et al., "TCP Over Second (2.5G) and Third (3G) Generation Wireless Networks" (Feb. 2003).

Fitzek, et al., "A Prefetching Protocol for Continuous Media Streaming in Wireless Environments" *IEEE Journal on Selected Areas in Communication*, vol. 19, No. 10, Oct. 2001, pp. 2015-2028.

Stuhlmuller, et al., "Analysis of Video Transmission over Lossy Channels", *Selected Areas in Communications* IEEE Jun. 2000.

Fingscheidt, et al., "Joint Source-Channel (De-) Coding for Mobile Communications" *IEEE Transactions on Communications*, vol. 50, No. 2, Feb. 2002.

Yuan, et al., "Design and Evaluation of a Cross-Layer Adaption Framework for Mobile Multimedia Systems" *SPIE/ACM Multimedia Computing and Networking Conference (MMCN)*, pp. 1-13, 2003.

Toumpis, et al., "Performance, Optimization, and Cross-Layer Design of Media Access Protocols for Wireless Ad Hoc Networks" *Communications, 2003. ICC '03.* IEEE International Conference on, May 11-15, 2003.

Prehofer, et al., "An Architecture Supporting Adaptation and Evolution in Fourth Generation Mobile Communication Systems", *Journal of Communications and Networks*, vol. XX, No. Y, Jan. 1999.

Chou, P.A. and Miao, Z., "Rate-Distortion Optimized Streaming of Packetized Media" *Microsoft Corporation, Technical Report MSR-TR-2001-35*, Feb. 2001.

Kalman, et al., "R-D Optimized Media Streaming Enhanced with Adaptive Media Playout" *Multimedia and Expo, 2002. ICME apos;02. Proceedings*. 2002 IEEE International Conference on vol. 1, Issue, 2002 pp. 869-872 vol. 1.

Saha, et al., "Bringing the Wireless Internet to Mobile Devices" *IEEE*, Jun. 18, 2001.

International Preliminary Examination Report, Jan. 10, 2006.

Lee, et al., "Interlayer Interactions and Performance in Wireless Ad Hoc Network draft-irtf-ans-interlayer-performance-00.txt" Sep. 13, 2003.

Tanenbaum, Andrew S., Computer Networks $4^{th}$ Edition, 2002.

Kyamakya, et al., "Cross-layer Optimization, Especially Combination of Channel Estimation and Position Determination in Multihop Wireless Networks (Cellular and Adhoc)", IEEE 2003.

Shan, et al., "Cross Layer Techniques for Adaptive Video Streaming Over Wireless Networks" IEEE 2002.

* cited by examiner

FIG 3

Link-Layer:
- Transmission time arrangements in multi-user scheduling reduced to 7 cases

|        | Case 1 | Case 2 | Case 3 | Case 4 | Case 5 | Case 6 | Case 7 |
|--------|--------|--------|--------|--------|--------|--------|--------|
| User 1 | 3/9    | 4/9    | 4/9    | 3/9    | 2/9    | 3/9    | 2/9    |
| User 2 | 3/9    | 3/9    | 2/9    | 4/9    | 4/9    | 2/9    | 3/9    |
| User 3 | 3/9    | 2/9    | 3/9    | 2/9    | 3/9    | 4/9    | 4/9    |

FIG 6A

|        | Case 1 | Case 2 | Case 3 | Case 4 | Case 5 | Case 6 | Case 7 |
|--------|--------|--------|--------|--------|--------|--------|--------|
| User 1 | 3/9    | 4/9    | 4/9    | 3/9    | 2/9    | 3/9    | 2/9    |
| User 2 | 3/9    | 3/9    | 2/9    | 4/9    | 4/9    | 2/9    | 3/9    |
| User 3 | 3/9    | 2/9    | 3/9    | 2/9    | 3/9    | 4/9    | 4/9    |

FIG 6B

|    | I  | P1 | P2 | P3 | P4 | P5 | P6 | P7 | P8 | P9 | P10 | P11 | P12 | P13 | P14 |
|----|----|----|----|----|----|----|----|----|----|----|-----|-----|-----|-----|-----|
| CP | 43 | 7  | 7  | 7  | 6  | 5  | 8  | 6  | 7  | 7  | 6   | 6   | 4   | 5   | 5   |
| FM | 47 | 5  | 6  | 7  | 5  | 6  | 7  | 6  | 5  | 5  | 6   | 5   | 5   | 3   | 4   |
| MD | 50 | 1  | 2  | 3  | 3  | 3  | 4  | 4  | 4  | 5  | 6   | 8   | 10  | 12  | 14  |

APPARATUS AND METHOD FOR CONTROLLING AN OPERATION OF A PLURALITY OF COMMUNICATION LAYERS IN A LAYERED COMMUNICATION SCENARIO

CROSS-REFERENCE TO RELATED APPLICATION

This application is a continuation of copending International Application No. PCT/EP03/11441, filed Oct. 15, 2003, and is incorporated herein by reference in its entirety.

BACKGROUND OF THE INVENTION

1. Field of the Invention

The present invention is in the field of telecommunications and, in particular, in the field of communication systems using protocol layers for processing information to be transmitted and/or for processing received information.

2. Description of Related Art

In mobile wireless communication environment it is a challenging task to provide reliable high-quality services due to a dynamic behavior of a communication link, for example of a wireless link. Therefore, system designers have to cope with a non-predictable variation of transmission quality resulting from time-varying resource availability, fading errors, outages or handover. For wireless networks beyond the third generation systems (B3G), this dynamic behavior will negatively be affected since B3G systems are expected to span across heterogeneous wireless access network technologies with different transmission characteristics. However, the next generation wireless networks are expected to provide reliable and transparent services to the customers so that a seamless use of the network's diversity can be achieved.

Service and application provisioning in B3G does not only have to regard network's density but also application diversity as new business models which are expected to allow third party providers to offer their application on top of the operators' service platforms making use of advanced open interfaces. In order to take dynamically changing application requirements into account, which may result e.g. from varying user preferences or varying user context, the operators will need an ability to dynamically change the systems parameters in order to react to the varying requirements.

Usually, conventional communication systems apply a plurality of communication layers arranged to a protocol stack for information processing. FIG. 4 shows a protocol stack comprising a plurality of hierarchically arranged communication layers. The prior art protocol stack shown in FIG. 4 is disclosed in Andrew Tanenbaum, Computer Networks, 4$^{th}$ Edition, Francis Hall, 2003.

The protocol stack comprises a physical layer 901, a data link layer 903 arranged above the physical layer 901, a network layer 905 arranged on top of the data link layer 903, a transport layer 907 arranged at top of the network layer 905, and an application layer 911 arranged at top of the transport layer 907.

Generally speaking, the application layer is operative for managing the information to be transmitted. For example, the information comprises a media data stream, for example a video data stream, as information to be transmitted through a communication channel. Alternatively, the information may comprise a multimedia data stream consisting of video and audio information, to be transmitted through the communication channel. Furthermore, the application may comprise an electronic mail, etc. In other words, the application layer is operative for transforming the application to be transmitted into a transmittable information stream.

The application layer 911 directly communicates with the transport layer 907 being operative for providing a transport service, so that the information can be transmitted to a destination sink in dependency of the physical network used for communication. For example, the transport layer appends a transport protocol data unit (TPDU) to the information data stream in order to preserve a peer-to-peer communication which is common in all communication networks. Peer-to-peer communication means that for example the transport layer 907 communicates directly with another transport layer implemented in a destination network.

The transport layer 907 communicates directly with the network layer 905 being operative for processing an information frame provided by the transport layer 907, so that an end-to-end communication, i.e. communication between two computer entities, is possible.

The network layer 905 provides a network layer frame to a link layer comprising the data link layer 903 and the physical layer 901, wherein the data link layer 903 and the physical layer 901 may comprise a plurality of sub-layers, for example a medium access control sub-layer.

The link layer is operative for managing the transmission of the information represented by bits through the communication channel. For example, the data link layer 903 is operative for applying a forward error correction encoding (FEC) or forward error detection encoding, for re-transmission of erroneous data frames (packets) and, for example, for confirming of a correct reception of each frame by sending an acknowledgement frame. Furthermore, the data link layer 903 may be operative for scheduling the frames to be transmitted in, for example, a multi-user scenario. Scheduling means, that a frame is transmitted at a predetermined time slot (transmission time frame).

The data link layer 903 directly communicates with the physical layer 901 being operative for further encoding the streams provided by the data link layer 903 by, for example, performing a modulation using a modulation scheme modulating a carrier according to the information to be transmitted.

The embodiment of the protocol stack shown in FIG. 4 corresponds to a TCP/IP reference model described in the above-referenced document (TCP=transmission control protocol, IP=internet protocol). For the sake of convenience it is to be noted, that the protocol stack shown in FIG. 4 also corresponds to the OSI reference model (OSI=open system interconnect) with exception of two layers, namely a session layer and a presentation layer arranged between the application layer 901 and the transport layer 907.

The internet protocol stack as depicted in FIG. 4 is expected to be used as a basic platform for B3G systems and applications. However, in order to achieve a good transmission quality, within a varying transmission environment, an efficient use of the available network resources is necessary in order to adapt the communication system or the application to come up, for example, to varying transmission characteristics and application requirements. For example, in case of a frequency-selective communication channel, a suitable encoding of the data bit stream to be transmitted is necessary, so that a predetermined bit error probability, i.e. $10^{-6}$, is not increased. To do so, the physical layer may be, for example, operative, to adapt the modulation scheme to the current channel characteristic. Accordingly, a system adaptation can be performed on all protocol layers of the protocol stack by adapting the respective parameters determining an operation mode of a respective communication layer.

Conventionally, the optimization of the system for a specific application, for example a video stream, is performed in a vertical manner, for example in a system carrying only one service in a non-layered scenario, for example in the case of POTS (Plain Old Telephony Service).

In layered communication systems, such as wireless internet, traditionally, certain layers are independently optimized for an expected worst case scenario (worst condition), which results in an inefficient use of the available communication resources, for example in available bandwidth, an achievable data rate associated with a certain bit error probability etc.

In existing systems, the intra-layer adaptation is performed without considering inter-layer dependencies. In P. A. Chou, and Z. Miao, "Rate-Distortion Optimization Streaming of Packetized Media", Technical Report MSR-TR-2001-35, Microsoft Research, Microsoft Corporation, February 2001, a communication system is disclosed, where a media frame scheduling is performed by the application layer, wherein only in interdependency of the media frames transporting video and audio information is taken into account. In M. Kalman, E. Steinbach, and B. Girod, "R-D Optimized Media Streaming Enhanced with Adaptive Media Playout", International Conference on Multimedia and Expo, ICME 2002, Lausanne, August 2002, an adaptive media playout scheme is described, where the playout speed of audio data (for example voice) and video data is varied as a function of channel conditions. In S. Saha, M. Jamtgaard, J. Villasenor, "Bringing the wireless Internet to mobile devices", Computer, vol. 34, issue 6, pp. 54-58, June 2001, an adaptive middle layer is described, that applies transcoding of media data in order to adapt the currently used coding scheme to varying channel conditions. In H. Imura et al., "TCP over Second (2.5G) and Third (3G) Generation Wireless Networks", IETF RFC 3481, February 2003, a wireless TCP protocol stack is described, that distinguishes between packet losses due to a network congestion and losses due to erasures on a wireless link. In P. H. Fitzek, and M. Reisslein, "A prefetching protocol for continuous media streaming in wireless environments", IEEE Journal on Selected Areas in Communications, vol. 19, no. 10, pp. 2015-2028, October 2001, a data link layer re-transmission is described, where a delay constraint is taken into account. The known differentiated services approached (DIFFSERV) is based on an established priority among media packets, so that more important media packets are preferably scheduled. Additionally, adaptive modulation and encoding on the physical layer is known, as for example described in the IEEE 802.11a standard.

However, the above indicated prior art approaches suffer from the fact, that only one layer is optimized with respect to fulfilling an optimization goal. For example, in order to improve a transmission quality, the physical layer may be operative to adaptively adjust the transmission power depending on a current channel condition, for example a current channel attenuation. In other words, the above indicated prior art approaches rely on an optimization of only one parameter set determining an operation mode of the respective communication layer.

In order to more efficiently exploit the resources, an adaptation of two layers can be performed. In K. Stuhlmüller, N. Färber, and B. Girod, "Analysis of video transmission over lossy channels", IEEE Journal on Selected Area in Communication, vol. 18, no. 6, pp. 1012-1032, June 2000, and T. Fingscheidt, T. Hindelang, R. V. Cox, N. Seshadri, "Joint Source-Channel (De)Coding for Mobile Communications", IEEE Transactions on Communications, Vol. 50, No. 2, pp. 200-212, February 2002, a source and channel coding scheme is described. The adaptation scheme is based on an adaptation of a source rate and code rate depending on the channel conditions in terms of transmission quality. To be more specific, an analytic formula is disclosed enabling a calculating of a source rate and of a channel rate.

In W. Yuan, K. Nahrstedt, S. Adve, D. Jones, R. Kravets: Design and Evaluation of a Cross-Layer Adaptation Framework for Mobile Multimedia Systems, to appear in SPIE/ACM Multimedia Computing and Networking Conference (MMCN) 2003, an optimization of power control and transmission data rate is disclosed. In S. Toumpis, A. Goldsmith: Performance, Optimization, and Cross-Layer Design of Media Access Protocols for Wireless Ad Hoc Networks, IEEE International Conference on Communications (ICC), 2003 a medium access control (MAC) layer and physical layer optimization for ad hoc networks are described.

However, the prior art concepts applying cross-layer design for optimization purposes suffer from a disadvantage, that, within the communication system, only a certain optimization approach is considered for the intra-layer adaptation. Moreover, the prior art approaches do not consider inter-layer dependencies which results in an ineffective exploitation of the available resources.

Moreover, channel-aware scheduling may be applied in order to select a transmission time of media packet as a function of a channel condition.

The above-indicated prior art describes methods for optimization. However, the above-indicated prior art documents do not disclose an approach for enabling different kinds of cross-layer adaptation mechanisms.

A further disadvantage of the prior art approaches is that the disclosed optimization schemes are not flexible. Since the prior art approaches indicated above only consider one or two certain parameters for optimization, for example power control and transmission data rate, further optimization scenarios are not considered in order to fully exploit the available communication resources.

Since current system architectures are not designed for cross-layer adaptation, Prehofer, W. Kellerer, R. Hirschfeld, H. Berndt, and K. Kawamura, "An Architecture Supporting Adaptation and Evolution in Fourth Generation Mobile Communication Systems". Journal of Communications and Networks (JCN), Vol. 4, No. 4, December 2002, an open programmable communication system using the cross-layer adaptation concept is described. However, the programmable platforms only exist on every system level. Each platform consists of a stable and minimal platform base that allows coordinated configuration and additional platform components that could be added or removed. However, the last named prior art document does not disclose a concept for determining the parameters controlling operation modes of the programmable platforms.

SUMMARY OF THE INVENTION

It is an object of the present invention to provide a concept for an efficient cross-layer adaptation scheme in a communication system using communication layers for processing an information to be transmitted.

In accordance with a first aspect, the present invention provides an apparatus for controlling an operation of a plurality of communication layers of a layered communication system, the layered communication system transmitting information through a communication channel, wherein an operation of a first communication layer of the plurality of communication layers is determined by a first set of parameters, and wherein an operation mode of a second communication layer of the plurality of communication layers is determined by a second set of parameters, the apparatus having: means for providing a property of the communication channel; an extractor for extracting the first set of parameters of the first communication layer and the second set of parameters of the second communication layer to determine current stages of the first and second communication layer, wherein the first set of parameters is a subset of the parameters determining an operation mode of the first communication layer and the second set of parameters is a subset of the parameters determining an operation mode of the second communication layer; means for providing a first abstraction model and a second abstraction model, wherein the first abstraction model models a characteristic of the first communication layer, which depends on the first set of parameters, and wherein the second abstraction model models a characteristic of the second communication layer, which depends on the second set of parameters; means for jointly determining an optimized first set of parameters to be used by the first communication layer and an optimized second set of parameters to be used by the second communication layer based on the first abstraction model, the second abstraction model, the channel property and an optimization goal; means for providing the optimized first set of parameters to the first communication layer and the optimized second set of parameters to the second communication layer.

In accordance with a second aspect, the present invention provides a communication apparatus for processing an information to be transmitted in accordance with a transmission protocol, the transmission protocol having a plurality of protocol layers, having: an information source for providing the information; the above mentioned apparatus for controlling the plurality of protocol layers; a processor for processing the information in accordance with the protocol layers.

In accordance with a third aspect, the present invention provides a communication apparatus for processing a received signal in accordance with a reception protocol, the received signal being a received version of a transmission signal transmitted through a communication channel, the transmission signal having an information processed in accordance with a transmission protocol, wherein the transmission protocol has a first transmission protocol layer and a second transmission protocol layer, wherein an operation mode of the first transmission protocol layer is determined by a first set of transmission parameters, the first set of transmission parameters being a subset of the parameters determining an operation mode of the first transmission protocol layer, wherein an operation mode of the second transmission protocol layer is determined by a second set of transmission parameters, the second set of transmission parameters being a subset of the parameters determining an operation mode of the second transmission protocol layer, wherein the first set of transmission parameters and the second set of transmission parameters are pair-wise determined on a basis of abstraction models modeling a behavior of the first communication layer and the second communication layer, wherein the reception protocol has a first reception protocol layer and a second reception protocol layer, wherein an operation mode of the first reception protocol layer is determined by a first set of reception parameters, and wherein an operation mode of the second reception protocol layer is determined by a second set of reception parameters, the apparatus having: means for receiving a parameter information indicating the first set of transmission parameters and the second set of transmission parameters; means for determining the first set of reception parameters corresponding to the first set of transmission parameters and the second set of reception parameters corresponding to the second set of transmission parameters; means for providing the first set of reception parameters to the first communication layer and for providing the second set of reception parameters to the second communication layer.

In accordance with a fourth aspect, the present invention provides a method for controlling an operation of a plurality of communication layers of a layered communication system, the layered communication system transmitting information through a communication channel, wherein an operation of a first communication layer of the plurality of communication layers is determined by a first set of parameters, and wherein an operation mode of a second communication layer of the plurality of communication layers is determined by a second set of parameters, the method having the following steps of: providing a property of the communication channel; extracting the first set of parameters of the first communication layer and the second set of parameters of the second communication layer to determine current statuses of the first and second communication layers, wherein the first set of parameters is a subset of the parameters determining an operation mode of the first communication layer and the second set of parameters is a subset of the parameters determining an operation mode of the second communication layer; providing a first abstraction model and a second abstraction model, wherein the first abstraction model models a characteristic of the first communication layer which depends on the first set of parameters, and wherein the second abstraction model models a characteristic of the second communication layer, which depends on the second set of parameters; jointly determining an optimized first set of parameters to be used by the first communication layer and an optimized second set of parameters to be used by the second communication layer based on the first abstraction model, the second abstraction model, the channel property and an optimization goal; providing the optimized first set of parameters to the first communication layer and the optimized second set of parameters to the second communication layer.

In accordance with a fifth aspect, the present invention provides a method for processing an information to be transmitted in accordance with a transmission protocol, the transmission protocol having a plurality of protocol layers, the method having the following steps of: providing the information; controlling the plurality of protocol layers in accordance with the above mentioned method; processing the information in accordance with the protocol layers.

In accordance with a sixth aspect, the present invention provides a method for processing a received signal in accordance with a reception protocol, the received signal being a received version of a transmission signal transmitted through a communication channel, the transmission signal having an information process in accordance with a transmission protocol, wherein the transmission protocol has a first transmit protocol layer and a second transmit protocol layer, wherein an operation mode of the first transmission protocol layer is determined by a first set of transmission parameters, the first set of transmission parameters being a subset of the parameters determining an operation mode of the first transmission protocol layer, wherein an operation mode of the second transmission protocol layer is determined by a second set of transmission parameters, the second set of transmission parameters being a subset of the parameters determining an operation mode of the second transmission protocol layer, wherein the first set of transmission parameters and the second set of transmission parameters are pair-wise determined on a basis of abstraction models modeling a behavior of the first communication layer and the second communication layer, wherein the reception protocol has a first reception protocol layer and a second reception protocol layer, wherein an operation mode of the first reception protocol layer is determined by a first set of reception parameters, and wherein an operation mode of the second reception protocol layer is determined by a second set of reception parameters, the method having the following steps of: receiving a parameter information indicating the first set of transmission parameters and the second set of transmission parameters; determining the first set of reception parameters corresponding to the first set of transmission parameters and the second set of reception parameters corresponding to the second set of transmission parameters; providing the first set of reception parameters to the first communication layer and providing the second set of reception parameters to the second communication layer.

In accordance with a seventh aspect, the present invention provides a computer program having a program code for performing one of the above mentioned methods, when the program runs on a computer.

The present invention is based on the finding, that a plurality of communication layers can efficiently be controlled, when the parameters determining an operation mode of the particular communication layer are jointly determined by jointly emulating abstraction models describing a behavior of a particular communication layer. In particular, it has been found, that, on the basis of the abstraction models, optimum parameters can be found, so that a performance of the communication layers with respect to an optimization goal, for example transmission quality, and upon consideration of a channel property, for example bit error probability, can be optimized.

The inventive approach provides a concept for joint optimization of a plurality of communication layers in order to achieve a plurality of optimization goals. In particular in a multi user scenario, a communication system is operative for transmitting a first user signal and a second user signal through a communication channel. The first user signal may comprise an information, for example a video stream, to be transmitted, wherein a certain quality of transmission is necessary in order to reduce a signal distortion. Accordingly, the second user stream may comprise information to be transmitted. In this case, the optimization goal is to jointly optimize the performances of the communication layer being operative for processing the information and of the communication layer being operative for transmitting. In particular, the communication layer being operative for managing or processing the information may be the application layer previously discussed. Accordingly, the communication layer being operative for managing the transmission through the communication channel may comprise the physical layer shown in connection with the prior art protocol in FIG. 4.

In accordance with the present invention, the communication layers are jointly optimized by determining for example a first set of parameters determining an operation mode of a first communication layer and a second set of parameters determining an operation mode of a second communication layer. However, an operation mode of a particular communication layer cannot be analytically described due to interlayer dependencies, a complexity of operations performed by the particular communication layer and a plurality of jobs to be performed. In order to overcome this problem, abstraction models modeling a behavior (or a characteristic) of a particular communication channel can be used. Abstraction models expressed by of state diagrams are disclosed in Andrew Tanenbaum, Computer Networks, fourth addition, Prentice Hall, 2003. However, the abstraction models disclosed therein are commonly used for modeling a single communication layer.

In accordance with the present invention, the optimum set of parameters is determined by jointly emulating a behavior of at least two protocol layers, which have to be optimized on the basis of abstraction models modeling a particular characteristic of the protocol layer to be optimized.

It is an advantage of the present invention that an optimum set of parameters can dynamically be found in dependence on a current channel state condition and on the optimization goal. Therefore, a flexibility can be achieved with respect to adaptively optimizing the protocol stack in order to achieve a plurality of optimization goals in different transmission scenarios.

It is a further advantage of the present invention, that the communication layers are jointly optimized. Therefore, the available communication resources, e.g. an available bandwidth, can fully or almost fully be exploited, since a global optimization upon consideration of interlayer dependencies is performed.

It is a further advantage of the present invention that any protocol layers can be optimized since an information of a current state of a protocol layer or an information of a current channel condition is available to all communication layers. Therefore, the ineffective vertical information transport common to the prior art approaches is avoided. Therefore, depending on the optimization goal, channel property etc., any communication layers promising the best optimization results can be optimized in order to achieve the optimization goal.

An optimization scheme used for optimization of a communication system using communication layers (protocol layers), i.e. B3G systems, is cross-layer design. Here several layers of the protocol stack spanning from application parameters to physical transmission are considered. FIG. 5 shows an embodiment of a communication system, where an optimization of the communication system on the basis of cross-layer optimization in a vertical manner for one specific application is demonstrated.

The system shown in FIG. 5 comprises a sender 1001 (base station) and a receiver 1003. The sender 1001 applies a protocol stack 1005 for processing the application (information) to be transmitted. The protocol stack 1005 comprises an application layer, a transport layer, a network layer, and a link layer, comprising, for example, a medium access control layer (MAC) and a physical layer (PHY). Accordingly, the receiver 1003 applies a protocol stack 1007 for processing a receive signal being a version of a transmit signal transmitted by the sender 1001. The protocol stack 1007 (the receive protocol stack) comprises, accordingly, a link layer, an IP layer (corresponding to the network layer), a TCP/UDP layer (corresponding to the transport layer), and an application layer.

FIG. 5 also demonstrates a peer-to-peer communication principle, where the corresponding layers, for example the transport layers and the TCP/UDP layer communicate with each other.

In order to optimize the system for the specific application, for example a bottom up information delivery is performed. For example, the link layer extracts a channel property as a physical restriction parameter, for example a signal to noise ratio (SNR) or a maximum possible transmit power. The physical restriction parameters are then transported to the application layer, where video streaming using real-time coding- and encoding schemes (codec) is performed. In other words, the application layer adapts the real-time codec to the physical restriction parameters so that the required transmission quality for video streaming can be achieved.

Accordingly, the application layer may inform the link layer about quality of service (QOS) requirements (for example a certain bit error probability associated with a certain service). In this case, the link layer may apply a more comprehensive encoding scheme so that the quality of service requirement is fulfilled.

The inventive cross-layer adaptation technique depicted in FIG. 5 is based on inter-layer information exchange across the traditional layers of the protocol stack to adapt the system parts to a dynamically changing environment. As mentioned above, the information travels in both directions, up and down the protocol stack. Cross-layer information exchange means, that the application receives information from lower layers (for example the link layer) about the current network conditions and predictable events influencing the transmission quality, i.e. handover. Accordingly, the lower layers may receive information about the current transmission requirements of the application, as discussed above.

BRIEF DESCRIPTION OF THE DRAWINGS

Further embodiments of the present invention are described in detail with respect to the following figures, in which:

FIG. 3 demonstrates inventive transmission time arrangements in a multi user scheduling scenario;

FIG. 6a shows a multi-user scheduling with different time arrangements;

FIG. 6b shows a size (in terms of packets) for a group of pictures in 3 measured videos;

DESCRIPTION OF PREFERRED EMBODIMENTS

Figure 1:
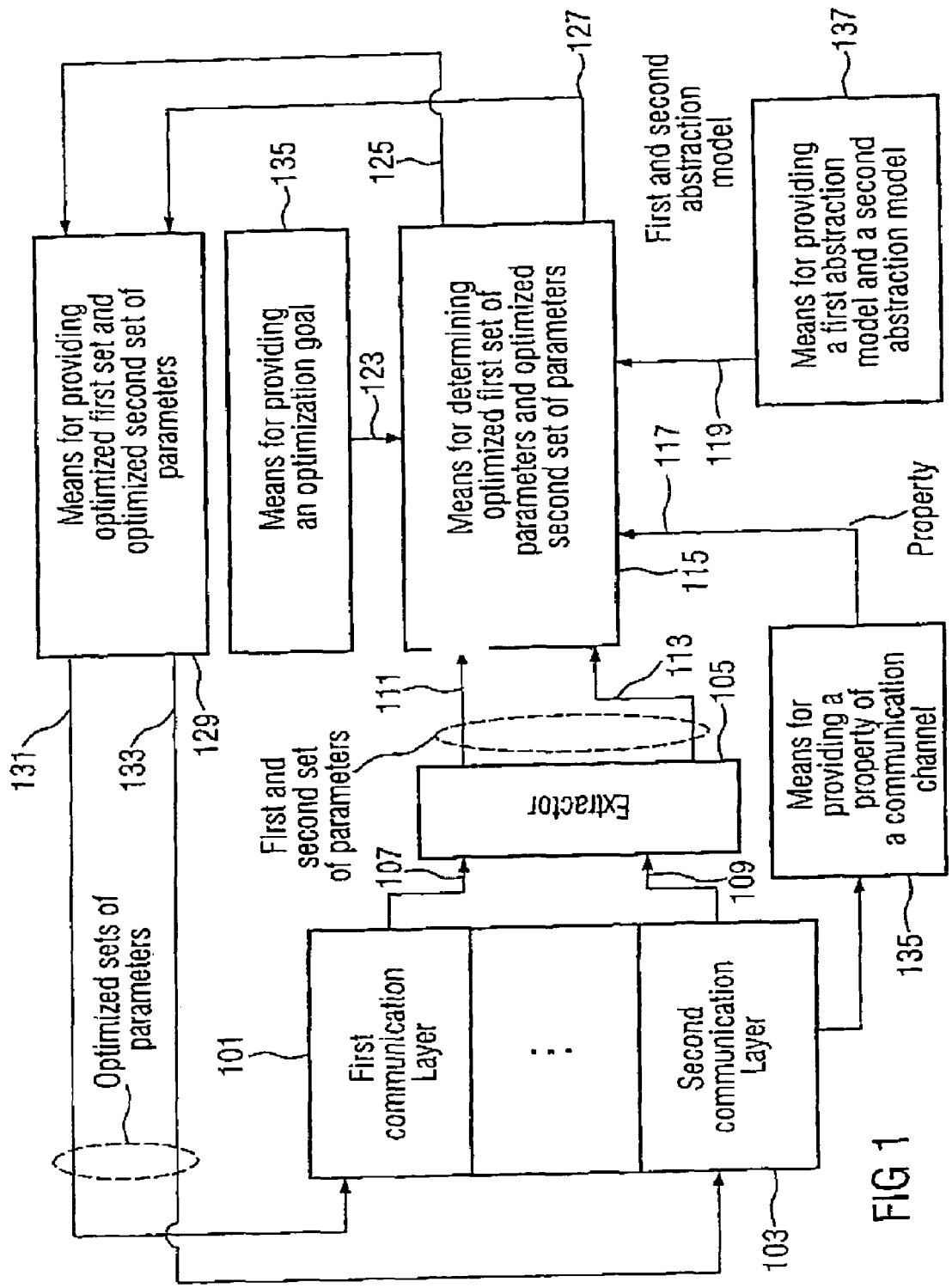
FIG. 1 shows a block diagram of an inventive apparatus controlling an operation of a plurality of communication layers in accordance with a first embodiment of the present invention.

In FIG. 1, a protocol stack comprising a first communication layer 101 and a second communication layer 103 is shown. In order to control an operation mode of the first communication layer 101 and the second communication layer 103, the inventive apparatus for controlling the operation of the plurality of communication layers (comprised by the protocol stack) comprises an extractor 105 having a first input 107, a second input 109, a first output 111 and a second output 113. The first communication layer 101 is coupled via the first input 107 to the extractor 105, whereby the second communication layer 103 is coupled via the second input 109 to the extractor 105. The first output 111 and the second output 113 are coupled to a means 115 for determining optimized first set of parameters and optimized second set of parameters. The means 115 for determining further comprises an input 117 and an input 119. Additionally, the means 115 for determining comprises an input 123, a first output 125 and a second output 127. The first output 125 and the second output 127 are coupled to a means 129 for providing the optimized first set and optimized second set of parameters. The means 129 for providing has as first output 131 coupled to the first communication layer 101 and a second output 133 coupled to the second communication layer 103.

Furthermore, the apparatus shown in FIG. 1 comprises means (135) for providing the optimization goal coupled to the input (123) of the means (115) for determining the optimized set of parameters.

The apparatus shown in FIG. 1 further comprises means 135 for providing a property of a communication channel. The means 135 for providing the property is coupled to the second communication layer 103. An output of the means 135 for providing the property is coupled to the input 117 of the means 115 for determining optimized first set of parameters and optimized second set of parameters.

Additionally, the apparatus of FIG. 1 comprises means 137 for providing a first abstraction model and a second abstraction model to the means 115 for determining the optimized first and second set of parameters. More specifically, the means 137 for providing the first abstraction model and a second abstraction model has an output coupled to the input 119 of the means 115 for determining.

The apparatus shown in FIG. 1 is operative for controlling the operation of the plurality of communication layers, wherein, by the way of example only, the first communication layer 101 and the second communication layer 103 are depicted. The layered communication system is operative for transmitting information through a communication channel to a remote receiver. An operation of the first communication layer 101 is determined by a first set of parameters. Accordingly, a second set of parameters determines an operation mode of the second communication layer. In order to control the operation of the first communication layer 101 and the second communication layer 103, the inventive extractor 105 extracts the first set of parameters of the first communication layer and the second set of parameters of the second communication layer to determine current statuses of the first and of the second communication layer. In order to access two or more communication layers from the plurality of communication layers, the extractor 105 may be controlled by the means 115 for determining the optimized set of parameters, so that only certain communication layers are jointly optimized to achieve the optimization goal. The extracted first and second set of parameters are provided to the means 115 for determining optimized first set of parameters and optimized second set of parameters to achieve an optimized operation mode of the protocol stack. The means 115 for determining is operative to determine the optimized first set of parameters to be used by the first communication layer 101 and the second optimized set of parameters to be used by the second communication layer 103 on the basis of the first abstraction model modeling the behavior of the first communication channel 101, the second abstraction model modeling the behavior of the second communication channel 103, the channel property provided by the means 135 for providing the channel property and an optimization goal, for example transmission quality in terms of data rate or bit error rate.

The means 115 for determining receives the first and the second abstraction model from the means 137 for providing the first and the second abstraction model. For example, the means 137 for providing the first and the second abstraction model comprises a storage element for storing a plurality of different abstraction models for different communication layers. In particular, the first abstraction model models a characteristic (a behavior) of the first communication layer where inter-layer dependencies may be taken into account. The characteristic of the first communication layer, which is modeled by the first abstraction model, depends on the first set of parameters comprising, for example, an information about an encoding scheme to be used. Accordingly, the second abstraction model models a characteristic of the second communication layer depending on the second set of parameters.

As mentioned above, the abstraction models may comprise state diagrams describing the respective operation mode. More specifically, the first abstraction model comprises a first state diagram having a state and a further state and a transition between the states. Accordingly, the second abstraction model comprises a second state diagram having a state and a further state and a transition between the states. The state diagrams may, for example, be implemented as Markov models, Petri nets etc. Generally, the first state diagram models a parameter dependent behavior of the first communication layer. Accordingly, the second state diagram models a parameter dependent behavior of the second communication layer. The parameter dependency means, that, for example, a transition between two states or an output generated in a certain state is basically determined by the corresponding set of parameters.

In order to determine the optimized first and second set of parameters, the means 115 for determining may be operative for selecting the abstraction models to be used for optimization from the means 137 for providing the first abstraction model and the second abstraction model. The first and the second abstraction model to be used for optimization may be fixed, since the emulation of the abstraction models may be performed by the means 115 for determining.

The means 115 for determining receives the first set of parameters and the second set of parameters and inserts the first set of parameters into the first abstraction model and the second set of parameters into the second abstraction model and jointly determines the first optimized set of parameters and the second set of parameters to achieve the optimization goal by jointly emulating the first abstraction model and the second abstraction model in dependence of the channel property, of the optimization goal and, of the current state of the first and second communication layer determined by the first and second set of parameters.

The means 115 for determining the optimized set of parameters may further comprise an analyzer for analyzing the first abstraction model using the first set of parameters and for analyzing the second abstraction model using the second set of parameters in dependence of the channel property for signaling, that the optimized first set of parameters and the optimized second set of parameters are to be determined, when the optimization goal cannot be achieved using the first set of parameters and the second set of parameters.

Furthermore, the means 115 for determining the optimized set of parameters may be operative for determining which communication layers have to be optimized to achieve the optimization goal.

In order to provide the optimized set of parameters to the corresponding communication layers, the inventive apparatus shown in FIG. 1 comprises the means 129 for providing the optimized first set of parameters to the first communication layer and the optimized second set of parameters to the second communication layer. Preferably, the means for providing the optimized first set and the optimized second set of parameters may comprise a protocol interface for interfacing with the first communication layer and the second communication layer.

As mentioned above, the means 115 for determining the optimized set of parameters is operative to take the channel property into account. The second communication layer may be a protocol layer being operative for managing a transmission of the information through the communication channel. For example, the second communication layer 103 comprises a physical layer being further operative for extracting the property of the communication channel, which is a common technique used in conventional communication systems. The means 135 for providing the property of the communication channel is coupled to the second communication layer 103 for receiving the property of the communication channel. Preferably, the means 135 for providing the property comprises a protocol layer interface for interfacing with the physical layer. The channel property provided by the means 135 for providing the property to the means 115 for determining may be a bit error probability or/and a channel data rate associated with the bit error probability or/and a transmission delay or/and a transmission power associated with the bit error probability or/and a channel coherence time or/and a channel coherent bandwidth.

As mentioned above, the optimization goal may comprise an optimization of transmission quality. In this case, the means 115 for determining is operative for jointly determining the optimized first set of parameters and the optimized second set of parameters by emulating a behavior of the first communication layer using the first abstraction model and a behavior of the second communication layer using the second abstraction model, wherein the first set of parameters and the second set of parameters are initial parameters so that the emulation of the abstraction models can be begun starting from the current states of the respective communication layers.

For example, the first communication layer is operative for encoding the information to provide an information signal having an information rate associated with a distortion. The first communication layer may be, for example, the application layer discussed in connection with the prior art protocol stack. The distortion describes a difference between a transmitted and a received information. In accordance with the (known) rate distortion theory, an information can be transmitted with a minimum information rate associated with a certain distortion or a certain distortion profile, so that the information can be reconstructed in the receiver.

For example, the first communication layer is operative for encoding the information to provide the information signal, wherein a data compression is achieved. Accordingly, the second communication layer is operative for encoding the information signal to obtain a transmit signal for transmission through the communication channel. For example, the second communication layer comprises a data link layer and a physical layer previously described. Preferably, the transmit signal has a data rate associated with a certain bit error probability, for example $10^{-6}$, supporting the information rate. In this case, the optimization goal comprises an optimization of the transmission quality by encoding the information such that a minimum achievable information rate is achieved, so that a distortion profile is not exceeded, and by encoding the information signal to obtain the transmit signal having the data rate, whereby the bit error probability is not exceeded, so that, at the receiver, the information can be reconstructed. In order to achieve the optimization goal, the means 115 for determining is operative for jointly determining the optimized first set of parameters to be used for encoding the information to obtain the information signal having the information rate associated with the distortion and the optimized second set of parameters to be used for encoding the information signal to obtain the transmit signal having the data rate supporting the information rate.

As mentioned above, the inventive concept may also be applied to optimization of the protocol layer for the case of a multi user transmission scheme. In this case, the information comprises a first information associated with a first user and a second information associated with a second user, according to a multi user scenario. The optimization goal is for example an optimized transmission quality for the first information, i.e. for the first user, and for the second information, i.e. for the second user. The first communication layer is in this case operated for encoding the first information to obtain a first information signal associated with the first user and a second information signal associated with the second user. Accordingly, the second communication layer is then operative for encoding the first information signal and the second information signal to obtain a composite signal to be transmitted through the communication channel. In order to achieve the optimization goal, the means 115 for determining is operative for jointly determining the optimized first set of parameters to be used by the first communication layer for encoding the first information and the second information, and the optimized second set of parameters to be used by the second communication layer for encoding the first information signal and the second information signal to optimize the transmission quality of the first information and of the second information.

For example, the second communication layer is operative for scheduling the first information signal and the second information signal using the optimized second set of parameters. In this context, scheduling is a certain form of encoding. Hence, the first information signal is transmitted within a first time frame and the second information signal is transmitted within a second time frame, wherein the first and the second time frame are determined, for example, by a time frame required for transmitting the composite signal. Preferably, the means 115 for determining is operative for determining the optimized first set of parameters to obtain the first information signal having a first information rate associated with a first distortion and to obtain the second information signal having a second information rate associated with a second distortion. Simultaneously, the means 115 for determining is operative for determining the second set of parameters to obtain the composite signal having a data rate supporting the first information rate and the second information rate. In other words, the first communication layer is operative for processing of the information to be transmitted and the second communication layer is operative for user scheduling.

In accordance with the present invention, also an information scheduling, for example media data scheduling can be performed while optimizing the operation mode of the protocol stack. In this case, the first information associated with the first user comprises a first subinformation and a second subinformation. The means 115 for determining is further operative for determining the first optimized set of parameters to be used by the first communication layer for selectively encoding the first subinformation and the second subinformation to obtain the first information signal. For example, the means 115 for determining is operative for determining the optimized first set of parameters for scheduling the first subinformation and the second subinformation within the first information signal, so that the first subinformation and the second subinformation are placed at different positions of the first information signal. In other words, the first subinformation and the second subinformation are transmitted at different time instants within a transmission frame.

As mentioned above, the means 115 for determining the optimized set of parameters may operate on a basis of current statuses of the first and the second communication layer. In accordance with a further embodiment of the present invention, the means 115 for determining optimized first and second set of parameters is further operative for monitoring a current status of the first communication layer determined by the first set of coefficients, i.e. coefficients currently in use, and a current status of the second communication layer determined by the second set of coefficients, i.e. coefficients currently in use, and to provide a current status information. The status information may for example, indicate, that the optimization goal cannot be achieved using the first and the second set of parameters, so that the optimized first and/or second set of parameters are to be determined. The means 115 for determining is operative for making a decision, which set of parameters has to be optimized and replaced.

As mentioned above, the inventive concept may also be applied for optimization of the protocol stack by information scheduling and user scheduling. For example, the information comprises a first information associated with the first user and a second information associated with a first user, a third information associated with a second user and a fourth information associated with the second user. The first communication layer is operative for scheduling the first information and the second information to obtain a first information signal associated with the first user.

Additionally, the first communication layer is operative for scheduling the third information and the forth information to obtain a second information signal associated with the second user. The second communication layer is operative for scheduling the first information signal and the second information signal to obtain a scheduled multi user stream for transmission. The means 115 for determining is operative for jointly determining the optimized first set of parameters to be used by the first communication layer to provide the first information signal and the optimized second information signal, and the second set of parameters to be used by the second communication layer for providing the scheduled multi user signal, so that the optimization goal, for example optimization of the transmission quality for each user, is achieved.

In order to provide the respective optimized set of parameters to the respective communication layer, the inventive apparatus comprises the means 129 for providing the optimized first and second set of parameters to the first communication layer 101 and to the second communication layer 103. The means 129 for providing the optimized sets of parameters may comprise a protocol interface for interfacing with the first communication layer and with the second communication layer. For example, the second communication layer comprises a physical layer. In this case, the means 129 for providing the optimized sets of parameter interfaces with the physical layer via a corresponding physical layer interface. Usually, the physical layer is responsible for modulation, for example, amplitude modulation. Hence, the second set of parameters or the optimized second set of parameters may comprise a subset of modulation parameters determining a modulation scheme to be used. In accordance with the present invention, the means 115 for determining is further operative for controlling an operation mode of the physical layer by, for example, determining the subset of modulation parameters to be used.

Accordingly, the second communication layer may comprise a data link layer being operative for forward error encoding using a subset of encoding parameters determining a forward error encoding scheme to be used. In this case, the means 115 is further operative for determining the subset of encoding parameters to be used by the physical layer in order to achieve the optimization goal.

Preferably, the inventive apparatus for controlling the operation of the plurality of the communication layers is integrated within a communication apparatus for processing information to be transmitted in accordance with a transmission protocol. The transmission protocol may comprise a plurality of protocol layers to process the information to be transmitted, wherein the information is provided by an information source, for example a CD. In order to control the plurality of protocol layers, the inventive communication apparatus comprises the apparatus for controlling the operation of the plurality of communication layers in accordance with the above description. Additionally, in order to process the information in accordance with the protocol layers, the inventive communication apparatus further comprises a processor for processing the information. The processor may be a network processor.

Figure 2:
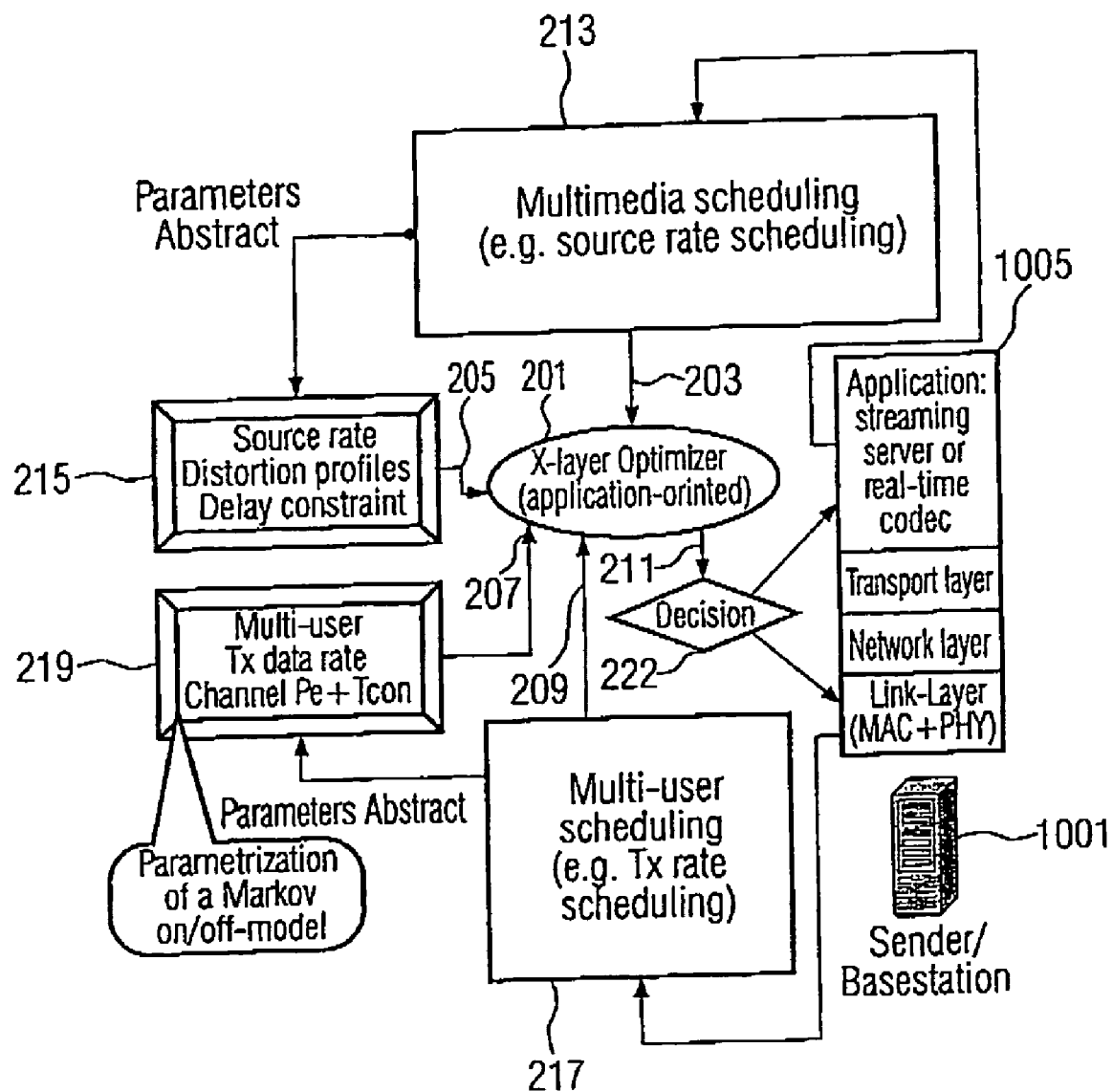
FIG. 2 shows an embodiment of an apparatus for controlling an operation of a plurality of communication layers in accordance with a further embodiment of the present invention.
Figure 4:
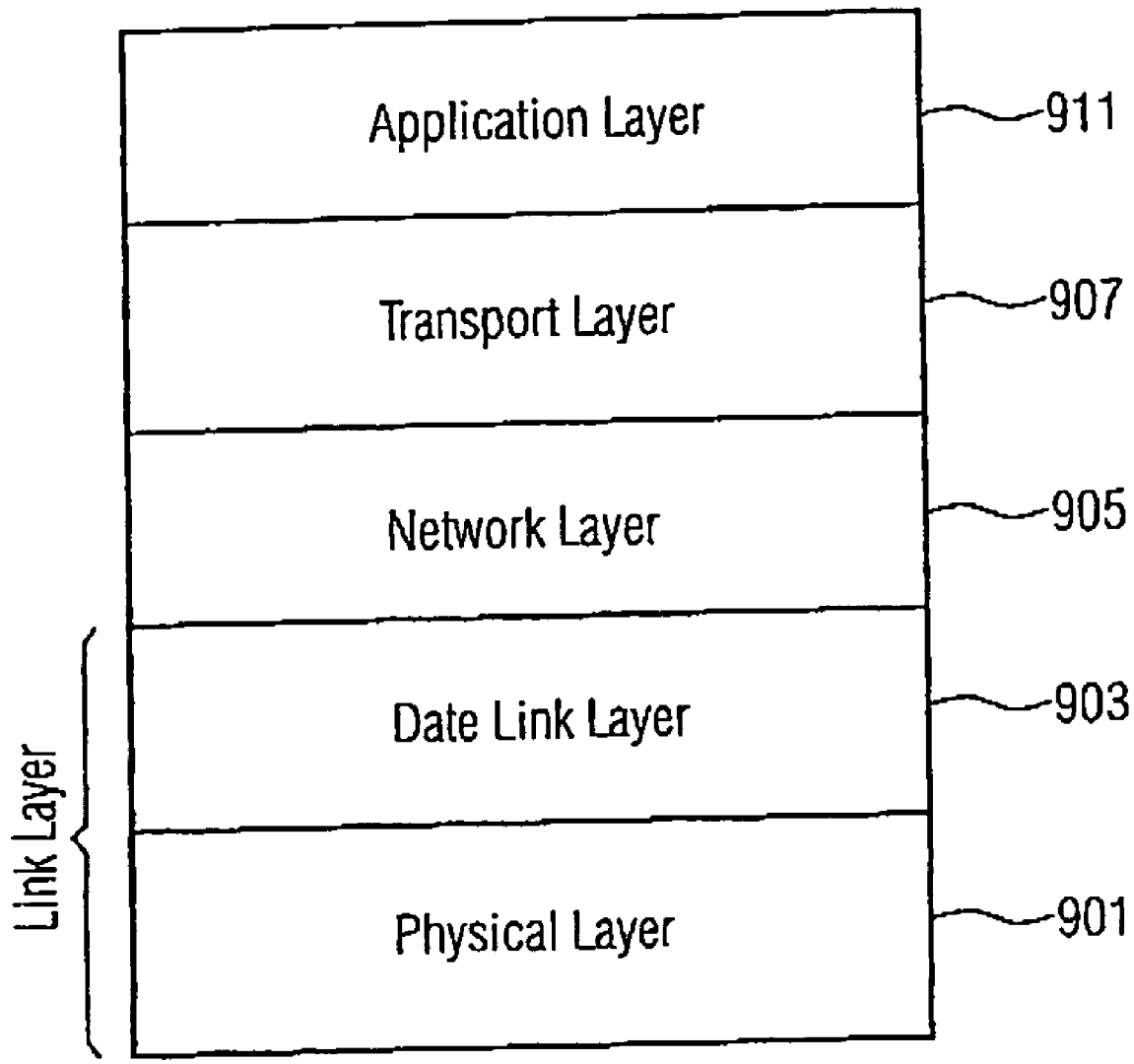
FIG. 4 shows an embodiment of a protocol stack.
Figure 5:
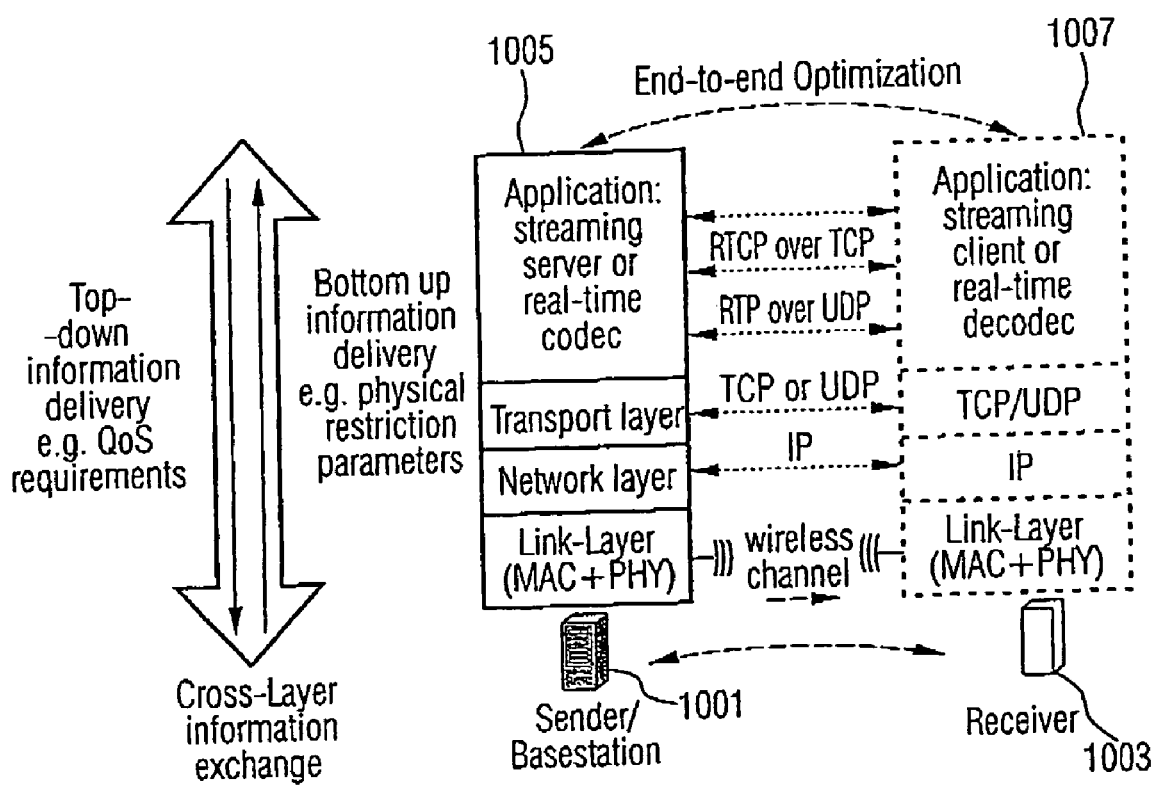
FIG. 5 demonstrates a cross-layer approach.

FIG. 2 shows a further embodiment of an apparatus for controlling an operation of a plurality of communication layers.

The apparatus shown in FIG. 2 comprises a cross-layer optimizer 201 having an input 203, 205, 207, an input 209 and an output 211. A first interface 213 is coupled between the application layer of the protocol stack 1005 and the input 203 of the cross-layer optimizer. The first interface 213 has an output coupled to an input of a block 215. The block 215 has an output coupled to the input 205 of the cross-layer optimizer, which is an application oriented optimizer.

Furthermore, a second interface 217 is coupled between the link layer of the protocol layer 1005 and the input 209 of the cross-layer optimizer 201. The second interface 217 further comprises an output coupled to an input of a second block 219 having an output coupled to the input 207 of the cross-layer optimizer.

The output 211 of the cross-layer optimizer 201 is coupled to a decision element 222 having a first output coupled to the application layer and a second output coupled to the link layer.

The first interface 213 is operative for extracting the parameters of the application layer, i.e. the first set of parameters, in order to perform a multi media scheduling, e.g. source rate scheduling. The parameters extracted by the interface 213 are provided to the first block 215 comprising, for example, source distortion profiles and delay constraint.

Accordingly, the second interface 217 is operative for extracting the parameters from the link layer with respect to multi user scheduling, e.g. transmit rate scheduling, and provides the parameters abstract to the second block 219 and to the cross-layer optimizer 201. The second block 219 provides an information comprising a multi user transmit data rate, channel coherence time or packet loss rate (Pe). The cross-layer optimizer determines the optimized set of parameters by emulating of the abstraction models. The decision element 222 is operative to provide the optimized sets of parameters to the corresponding communication layers.

As depicted in FIG. 2, the parameters abstract is performed on the basis of a parameterization of a Markov on/off model, by the way of example only, which is an abstraction model used for determining the optimized set of parameters.

The inventive apparatus and the corresponding methods introduce an improvement of user perceived quality in real time application in a wireless environment in such a way that the optimizer component (corresponding to the apparatus for controlling the operation of a plurality of communication layers) residing at a service platform level performs coordination, modeling and decision making functionalities. In particular, the optimizer component may perform the following tasks: monitoring of status information of selected systems layers, maintenance of appropriate abstraction models to make the status information manageable, dynamic analysis of the abstraction models, joint optimization of parameters based on these models, dynamic decision making, which new parameter settings are necessary in which system layer, feeding the parameters back in order to control the system at the respective layers, rolling back to an initial state, if it is impossible to provide the parameters to or to use the parameters in all layers simultaneously.

Furthermore, the inventive decision making is characterized by the fact that a decision on a parameter modification is made upon consideration of the current settings and the history into account to avoid unnecessary flickering of the system's status.

The inventive optimizer component is capable of realizing and supporting different algorithms for cross-layer optimization by performing a coordination and modeling tasks, as described above. For example, the inventive cross-layer optimization supports an improved utilization of wireless network resources, which allows supporting more simultaneous users in the same system compared with the prior art approaches. For the case of the same number of users, a quality of transmission can be improved. Moreover, more equally distributed user perceived quality among multiple users can be achieved. Furthermore, the inventive approach provides a possibility of a dynamic adaptation to varying transmission characteristics and application requirements at the same time. Summarizing, the inventive concept provides a possibility for cost saving for the system operator and better user satisfaction and service acceptance.

Referring again to the embodiment shown in FIG. 2, a possible implementation of the optimizer component residing in the application support middleware of a layered communication system is shown, wherein, by the way of example, a cross-layer adaptation of video streaming application and link layer transmission control is demonstrated. Here, a joint optimization of video data scheduling on the application layer and multi user scheduling on the link layer is depicted. The goal is to maximize the end-to-end quality perceived by the users while efficiently using the wireless resources. Video data scheduling is a process of deciding which data segment within one streaming session has to be sent at what time, while multi user scheduling determines, for instance, which user is allowed to use the channel at a given time, frequency or code.

In particular, the embodiment shown in FIG. 2 demonstrates the tasks of the inventive optimizer component, wherein status information is collected from the selected system layers, in particular from the application layer and from the link layer including medium access control (MAC) layer and physical layer (PHY). In this embodiment, attention is paid to multi media scheduling, i.e. scheduling of the source data (information) by specifying transmission order of the different types of media frames that have different impact on the overall quality. In addition, the inventive approach also considers a selection of the source rate. As there are uncountable combinations possible, the optimizer component provides an abstraction of the parameters in order to maintain combinations with significant impact and to analyze the impact of one specific combination quickly by emulating the abstraction models. In this embodiment, for each combination, an implementation of a source rate distortion profile is maintained.

Similar abstractions are performed for the link layer, where, by the way of example, selected cases of possible transmission time scheduling are regarded. FIG. 3 shows different transmission time arrangements in multi user scheduling system reduced to seven cases, as an example for a system with 3 users.

Based on the abstraction models, the inventive optimizer components dynamically analyzes the result of the changing channel conditions that is a part of the link layer abstraction model to the perceived quality according to a cost function that is based on both models. The analysis results in a jointly optimized set of parameters.

According to the optimization policy (described e.g. in the cost function), the optimizer component decides which new parameter settings are necessary in which system layer and feeds the respective parameters back to control the system behavior at the respective layers. If an error occurs, e.g., if one layer cannot be controlled, a roll back mechanism is started to return to the initial state.

The present invention further provides a communication apparatus for processing a received signal in accordance with a reception protocol, wherein the received signal is a received version of a transmit signal transmitted through a communication channel. The transmit signal may comprise an information processed in accordance with a transmission protocol described above, wherein the transmission protocol comprises a first transmission protocol layer and a second transmission protocol layer, and wherein an operation mode of the first transmission protocol layer is determined by a first set of transmission parameters, and wherein an operation mode of the second transmission protocol layer is determined by a second set of transmission parameters. For example, the first set of transmission parameters and the second set of transmission parameters are pairwise determined on a basis of abstraction models modeling a behavior of the first communication layer and the second communication layer as described above. Accordingly, the reception protocol comprises a first reception protocol layer and a second reception protocol layer, wherein an operation mode of the first reception protocol layer is determined by a first set of reception parameters, and wherein an operation mode of the second reception protocol layer is determined by a second set of reception parameters.

The inventive apparatus further comprises means for receiving a parameter information indicating the first set of transmission parameters and a second set of transmission parameters from, for example, a remote communication sender by the means of signaling. Furthermore, the inventive apparatus comprises means for determining the first set of reception parameters corresponding to the first set of transmission parameters and the second set of reception parameters corresponding to the second set of transmission parameters and means for comprising the first set of reception parameters to the first communication layer and for providing the second set of reception parameters to the second communication layer.

It is to be noted that the inventive approach can generally be used in the case of a plurality of users and/or in the case of a plurality of informations associated to each user.

In the following, we describe cross-layer optimization of application layer and radio link layer for wireless multi-user multimedia communication. Our aim is to optimize the end-to-end quality of the wireless media application as well as efficiently utilize the wireless resources. A new architecture for achieving our goal is provided and formulated. This architecture consists of the process of parameter abstraction, a cross-layer optimizer, and the process of decision distribution. In addition, sample numerical results are provided to reveal the potential of the inventive joint optimization. Cross layer design in mobile communication has recently gained much attention in the context of multimedia service provisioning (e.g., voice, video, audio, data). The concept of cross-layer design introduces inter-layer concepts across the protocol stack and allows us to jointly optimize the communication on two or more layers. Although this concept can be employed in all communication networks, it is especially important in wireless networks because of the unique challenge of the wireless environment (i.e., the time-varying and the fading nature of the wireless channels). This wireless nature and user mobility lead to random variation in network performance and connectivity. In addition, the demanding quality of service (QoS) requirements (e.g., data rate, latency, continuity and error rate) for multimedia support makes mobile multimedia communication even more challenging in system design. This challenge will be hard to meet with a conventional layered design approach, which separates system design into essentially independent layers. In order to provide end-to-end QoS, parameter adaptation has to be addressed at all OSI (Open Systems Interconnection) layers. Therefore, the inventive concept of cross-layer design is provided, for which information has to be exchanged between different layers. In the following, we exploit the inter-layer coupling of a cross layer design concept by proposing a joint application and radio link layer optimization for wireless multimedia communication. We refer to the radio link layer as the physical layer and the data link layer in the protocol stack. Our aim is to optimize the end-to-end quality of the wireless multimedia communication application as well as efficiently utilize the wireless resources. To achieve this aim, an architecture for the joint layer optimization is developed to provide a potential solution for the implementation of the cross layer optimization concept. This architecture consists of the process of parameter abstraction, across-layer optimizer, and the process of decision distribution. Every part in this architecture is formalized. In addition, sample numerical results are provided to reveal the potential of the inventive joint optimization. Previous work mainly concentrates on optimizing the performance at a single layer, such as the adaptation of the application to the transport, network, data-link and physical layer characteristics (bottom-up approach) and the adaptation of the physical, data link or network layers to the application requirements (top-down approach). Most of the on-going research in cross layer design focuses on joint optimization of the physical layer and data link (or MAC) layer. Some include the optimization of routing at the network layer in the cross layer optimization for ad hoc wireless networks and others include the source rate in the joint optimization of transmit power and forward error correction coding at the physical layer.

The present approach is different from previous approaches in that our goal is preferably to optimize the end-to-end quality of multimedia applications. For this we consider the joint optimization of three layers in the protocol stack, namely the application layer (layer 7), the data link layer (layer 2), and the physical layer (layer 1). We include the application layer in the joint optimization because the end-to-end quality observed by the users directly depends on the application and the application layer has direct information about the impact of each successfully decoded piece of media data on the perceived quality. We also include the physical layer and the data link layer in our consideration because the unique challenge of mobile wireless communication results from the nature of the wireless channel, which these two layers have to cope with. A new architecture for achieving our goal is provided and formulated. The structure of this paper is as follows.

Figure 7:
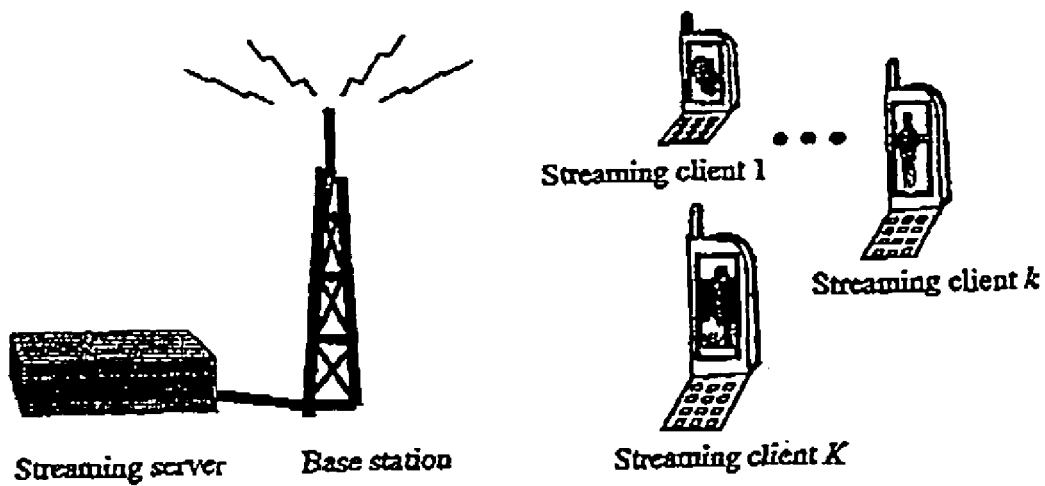
FIG. 7 shows a block diagram of a considered communication system.
Figure 8:
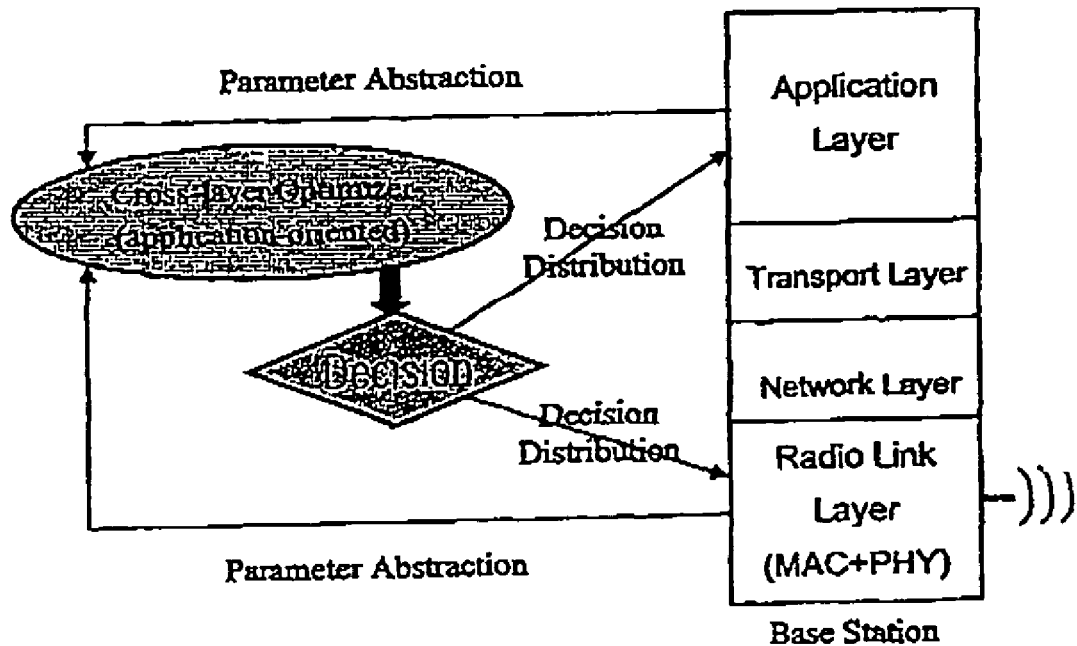
FIG. 8 shows an inventive system architecture for joint layer optimization.

We assume streaming video as an example application for the multimedia service and consider a video-streaming server located at the base station and multiple streaming clients located in mobile devices. As shown in FIG. 7, K streaming clients or users are assumed sharing the same air interface and network resources but requesting different video contents. Note that only the protocol stack necessary for the wireless connection has to be considered since in our scenario the video streaming server is located directly at the base station. Therefore, the transport layer and the network layer in the protocol stack can be excluded from our optimization problem. We focus on the interaction between the application layer and the radio link layer, which incorporates both the physical (PHY) layer and the data link layer. At the base station, an architecture as shown in FIG. 8 is suitable to provide end-to-end quality of service optimization. This Fig. illustrates the tasks and information flows related to the joint optimization. Necessary state information is first collected from the application layer and the radio link layer through the process of parameter abstraction for the cross-layer optimizer. The process of parameter abstraction results in the transformation of layer specific parameters into parameters that are comprehensible for the cross-layer optimizer, so called cross-layer parameters. Then, the optimization is carried out by the cross-layer optimizer with respect to a particular objective function. From a given set of possible cross-layer parameter tuples, the tuple optimizing the objective function is selected. After the decision on a particular cross-layer parameter tuple is made, the optimizer distributes the decision information back to the corresponding layers. Note that the set of possible cross-layer parameter tuples in general can be infinite. It is necessary to pre-select only a finite set of appropriate tuples in order to obtain the decision quickly. In this way, the final decision on the optimal cross-layer parameter tuple might result only in a local optimum.

In order to carry out the joint optimization, state information or a set of key parameters have to be abstracted from the selected layers and provided to the cross-layer optimizer. This is necessary because layer specific parameters may be incomprehensible or of limited use to other layers and the optimizer.

In wireless networks, the physical layer and the data link layer are dedicatedly designed for the dynamic variation of the wireless channel during the provision of a particular service. This is in contrast to wireline networks which experience much less dynamic variation. The physical layer deals with the issues including transmit power (through transmit power control), channel estimation, synchronization, signal shaping, modulation and signal detection (through signal processing), while the data link layer is responsible for radio resource allocation (multi-user scheduling or queuing) and error control (by channel coding, usually a combination of forward error correction coding (FEC) and automatic retransmission (ARQ)). Since both of these two layers are closely related to the unique characteristics of the wireless nature, it is useful to consider them together. In the following, we refer to their combination as the radio link layer. Since there are many issues in the radio link layer and these issues are related to each other, parameter abstraction is necessary. To be more specific, we define the set $R=\{r_1, r_2, \ldots\}$ tuples $r_i=(r_i^1, r_i^2, \ldots)$ of radio link layer specific parameters $r_i^j$ (e.g., modulation alphabets, code rate, air time, transmit power, coherence time). Since these radio link specific parameters may be variable, the set R contains all possible combinations of their values and each tuple $r_i$ represents one possible combination.

In order to formalize the process of parameter abstraction, we define the set $\tilde{R}=\{\tilde{r}_1, \tilde{r}_2, \ldots\}$ of tuples $\tilde{r}_i=(\tilde{r}_i^1, \tilde{r}_i^2, \ldots)$ of abstracted parameters $\tilde{r}_i^j$. The relationship between the set R and the set $\tilde{R}$ is established by the relation $$G \subseteq R \times \tilde{R}$$

with domain R and co-domain $\tilde{R}$, which realizes a mapping between R and $\tilde{R}$. Here, the symbol × refers to the Cartesian product. G is the subset that defines the mapping between R and $\tilde{R}$. We call this mapping process radio link layer parameter abstraction. For a single user scenario, for example, four key parameters can be abstracted. They are transmission data rate d, transmission packet error rate e, data packet size s, and the channel coherence time t. This leads to the abstracted parameter tuple $\tilde{r}_i=(d_i, e_i, s_i, t_i)$. In a K user scenario, one can extend the parameter abstraction for each user. The parameter tuple $\tilde{r}_i$ then contains 4K parameters, $\tilde{r}_i=(d_i^{(1)}, e_i^{(1)}, s_i^{(1)}, t_i^{(1)}, \ldots, d_i^{(K)}, e_i^{(K)}, s_i^{(K)}, t_i^{(K)})$, in which a group of four parameters belongs to one user.

The transmission data rate d is influenced by the modulation scheme, the channel coding, and the multi-user scheduling. The transmission packet error rate e is influenced by the transmit power, channel estimation, signal detection, the modulation scheme, the channel coding, the current user position, etc. The channel coherence time t of a user is related to the user velocity and its surrounding environment, while the data packet size s is normally defined by the wireless system standard. These inter-relationships define the relation G. Alternatively, it is possible to transform the transmission packet error rate e and the channel coherence time t into the two parameters of the two-state Gilbert-Elliott model, which are the transition probabilities (p and q) from one state to another. The transformation is given by $$p = \frac{es}{td} \text{ and } q = \frac{(1-e)s}{td}$$

where p is the transition probability from the good state to the bad state and q is the transition probability from the bad state to the good state.

In this way, the abstracted parameter tuple becomes $\tilde{r}_i=(d_i^{(1)}, p_i^{(1)}, s_i^{(1)}, q_i^{(1)}, \ldots, d_i^{(K)}, p_i^{(K)}, s_i^{(K)}, q_i^{(K)})$. One advantage of this transformation is that the resulting parameter tuple $\tilde{r}_i$ is more comprehensible for high layers in the protocol stack.

The application layer is the layer where the media data is compressed, packetized, and scheduled for transmission. The key parameters to be abstracted for the cross-layer optimization are related to the characteristics of the compressed source data. This implies that these key parameters may depend on the type of application or service because the characteristics of the compressed source data may depend on the application or service. For a formal description, let us define the set $A=\{a_1, a_2, \ldots\}$ of tuples $\tilde{a}_i=(\tilde{a}_i^1, \tilde{a}_i^2, \ldots)$ of application layer specific parameters $\tilde{a}_i^j$. Since these application layer specific parameters may be variable, the set A contains all possible combinations of their values and each tuple represents one possible combination. We further define the set $\tilde{A}=\{\tilde{a}_1, \tilde{a}_2, \ldots\}$ of tuples $\tilde{a}_i=(\tilde{a}_i^1, \tilde{a}_i^2, \ldots)$ of abstracted parameters $\tilde{a}_i^j$.

Figure 9:
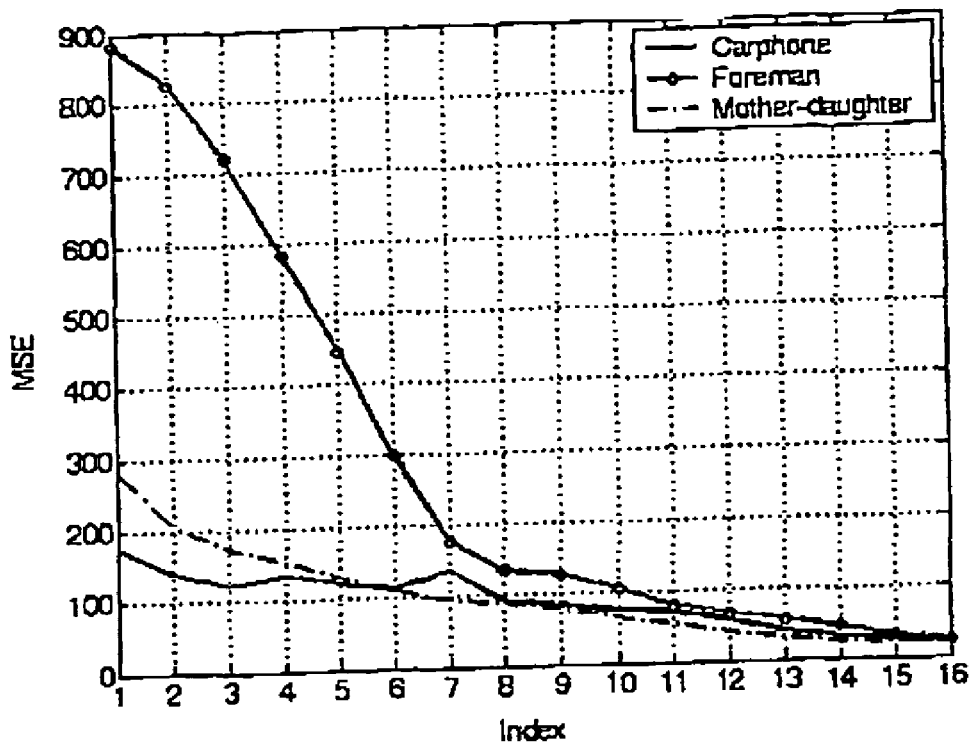
FIG. 9 shows a MSE for a group of pictures in 3 measured videos.

The relationship between the set A and the set Ã is established by the relation $$H \subseteq A \times \tilde{A}$$

with domain A and co-domain Ã, which realizes a mapping between A and Ã. We call this mapping process application layer parameter abstraction. In the following, we assume a streaming video service. The abstracted parameters of this service include the source data rate, the number of frames (or pictures) per second, size (in terms of bytes) and maximum delay of each frame (or picture). Other important information for the optimizer is the distortion-rate function (encoding distortion) and the distortion profile of a particular lost frame (or picture) (see FIG. 9). FIG. 9 shows an example of the distortion profile of lost frames and the encoding distortion for 3 different videos, each of which is composed of group of pictures (GOP) with 15 frames, which corresponds to 0.5 seconds at a frame rate of 30 frames per second. The video sequence are encoded at a mean data rate of 100 kbps. Each GOP starts with an independently decodable intra-frame. The following 14 frames are inter-frames, which can only be successfully decoded if all previous frames of the same GOP are decoded error-free. The distortion is quantified by the mean squared reconstruction error (MSE), which is measured between the displayed and the original video sequence. The index in FIG. 9 indicates the loss of a particular frame. It is assumed that as part of the error concealment strategy all following frames of the group of picture are not decodable and the most recent correctly decoded frame is displayed instead of the non-decoded frames. Also, note that the index 16 gives the MSE when all frames are received correctly, which we refer to as the encoding distortion because of the quantization error.

The abstracted parameter sets $\tilde{R}$ and $\tilde{A}$) from both the application layer and the radio link layer form the input to the cross-layer optimizer. Since any combination of the abstracted parameter tuples from the two input sets is valid, it is convenient to define the cross-layer parameter set $$\tilde{X} = \tilde{R} \times \tilde{A}$$

which combines the two input sets into one input set for the optimizer. The set $\tilde{X} = \{\tilde{x}_1, \tilde{x}_2, \ldots\}$ consists of tuples $\tilde{x}_n = (\tilde{r}_i, \tilde{a}_j)$ and $|\tilde{X}| = |\tilde{R}| \cdot |\tilde{A}|$.

With the formalism introduced above, the operation of the cross-layer optimizer $\Omega$ can now be described by $$\Omega : \tilde{X} \to \hat{X} \subset \tilde{X}$$

The optimizer selects from the input set $\tilde{X}$ a true non-empty subset $\hat{X}$ that is the output of the optimizer.

In the following, we assume $|\hat{X}| = 1$, that is the output of the optimizer is a single tuple and $\hat{X} = \tilde{x}_{opt} \in \tilde{X}$. The decision or output of the cross-layer optimizer $\tilde{x}_{opt}$ is made with respect to a particular objective function $$\Gamma : \tilde{X} \to \Re$$

where R is the set of real numbers. Therefore, the output of the optimizer can be expressed as $$\tilde{x}_{opt} = \arg\min_{\tilde{x} \in \tilde{X}} \Gamma(\tilde{x})$$

The choice of a particular objective function Γ depends on the goal of the system design and the output (or decision) of the optimizer might be different for different objective functions. In the example application of streaming video, one possible objective function in a single user scenario is the MSE between the displayed and the original video sequence. For a multi-user situation, different extensions of the MSE are possible. For example, the objective function can be the sum of MSE of all the users. That is, $$\Gamma(\tilde{x}) = \sum_{k=1}^{K} MSE_k(\tilde{x})$$

where $MSE_k(\tilde{x})$ is the MSE of user k for the cross-layer parameter tuple $\tilde{x} \in \tilde{X}$. This objective function will optimize the average performance among all users. Other common definitions of the objective function include which optimizes the performance of the worst performing user, and $$\Gamma(\tilde{x}) = \max_{k=1,\ldots,K} MSE_k(\tilde{x})$$

which is equivalent to maximizing the sum of the peak-signal-to-noise ratio of all users.

Once the output (or decision) of the cross-layer optimizer $\tilde{x}_{opt} = (\tilde{r}_{opt}, \tilde{a}_{opt})$ is obtained, the decisions $\tilde{r}_{opt}$ and opt $\tilde{a}_{opt}$ have to be communicated back to the radio link layer and the application layer, respectively. During this, the process of parameter abstraction has to be reversed and the abstracted parameters $\tilde{r}_{opt}$ and $\tilde{a}_{opt}$ are transformed back to the layer specific parameters $r_{opt} \in R$ $a_{opt} \in A$. This reverse transformation is given by $$r_{opt} \in \{r | (r, \tilde{r}_{opt}) \in G\}$$

and $$a_{opt} \in \{a | (a, \tilde{a}_{opt}) \in H\}$$

In case the set $\{r | (r, \tilde{r}_{opt}) \in G\}$ or the set $\{a | (a, \tilde{a}_{opt}) \in H\}$ has more than one element, the choice of a particular element can be made at the corresponding layers individually.

In the following, we provide sample simulation results to evaluate the performance of the inventive joint optimization. Throughout this section, we assume 3 users (user 1, 2, and 3), each of which requests a different video. User 1, 2, and 3 request the Carphone (CP), Foreman (FM), and Mother-daughter (MD) video, respectively. We choose the peak-signal-to-noise ratio (PSNR) as our performance measure. PSNR is defined as PSNR=10 $\log_{10}(255^2/MSE)$. The larger the PSNR is, the smaller the MSE, which is computed between the original video sequence and the reconstructed sequence at the client or user. Therefore, the larger the PSNR is, the better the performance. As an example, we use the objective function given above which maximizes the worst-case user's performance.

Figure 10:
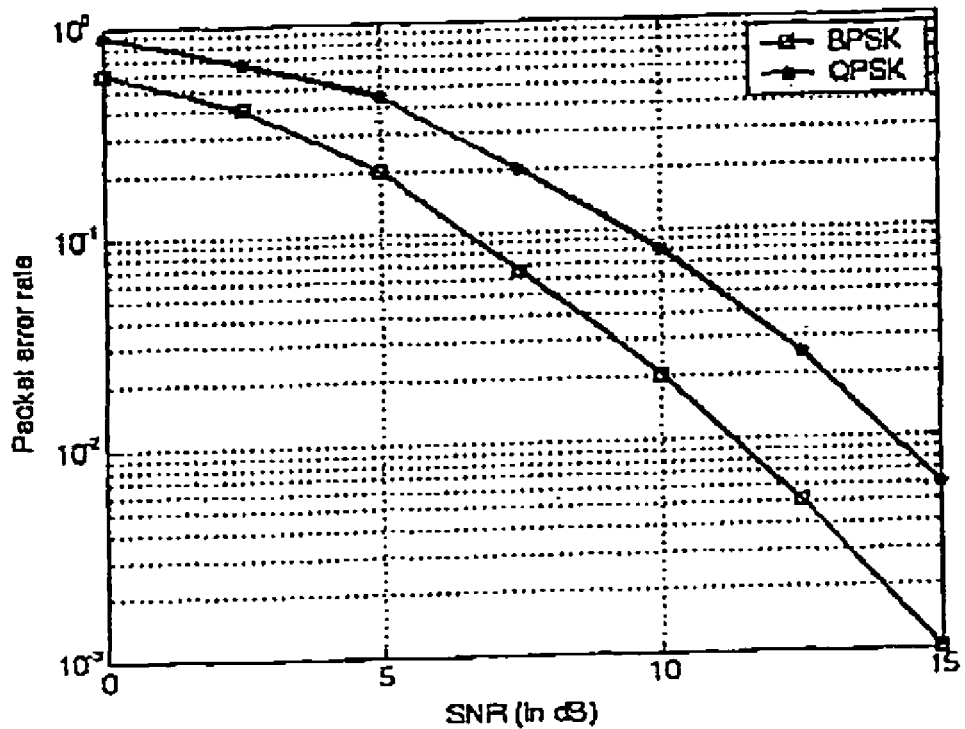
FIG. 10 shows a frame error rate with respect to signal-to-noise ratio.
Figure 11:
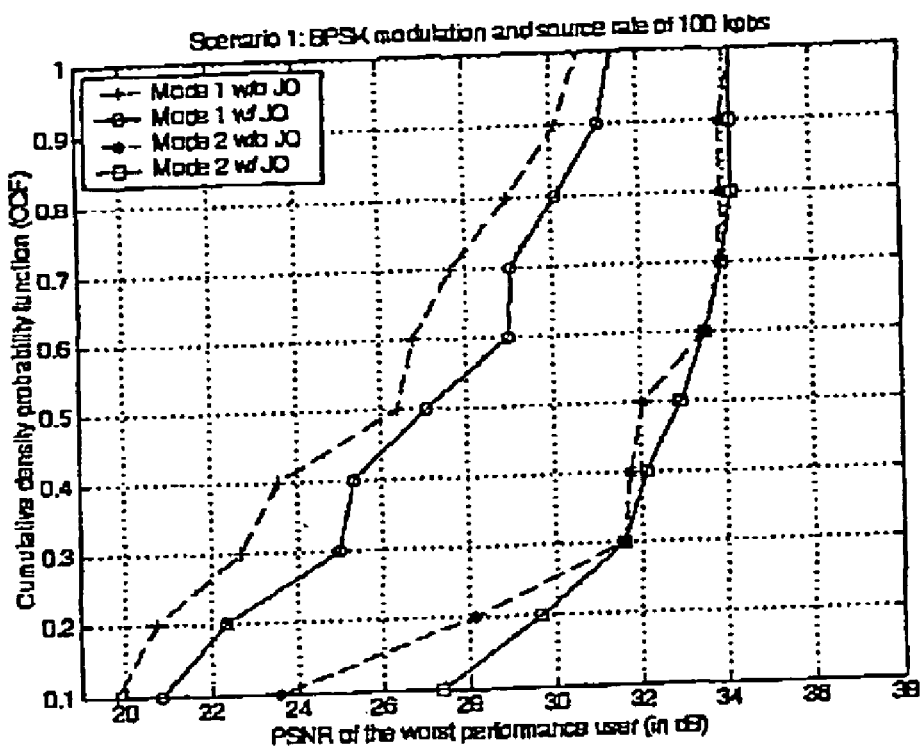
FIG. 11 shows a performance comparison for scenario 1.
Figure 12:
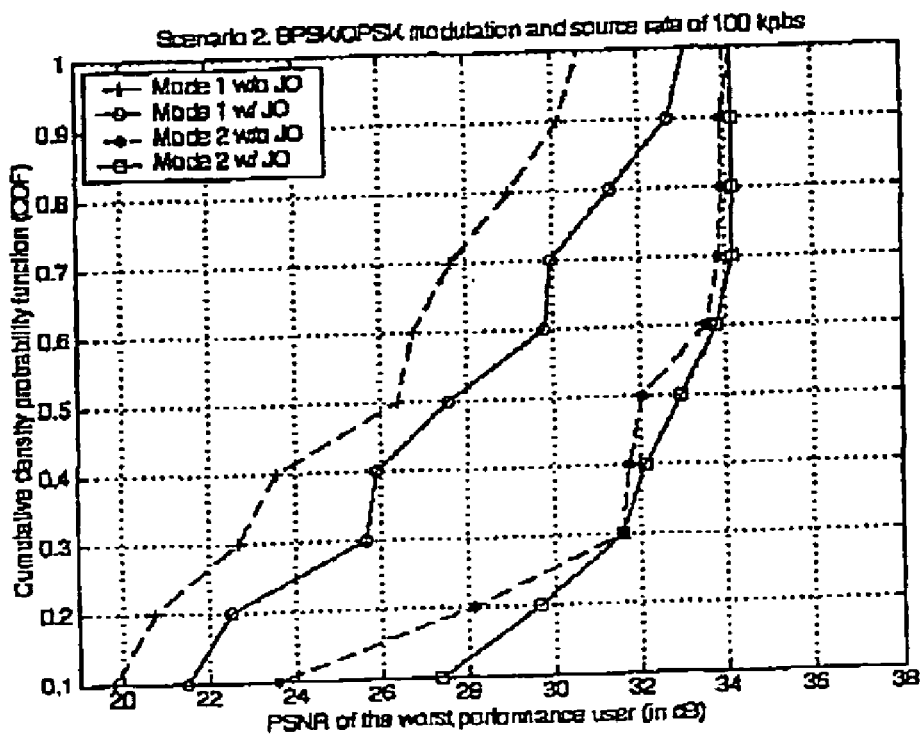
FIG. 12 shows performance comparison for scenario 2.
Figures 13, 14:
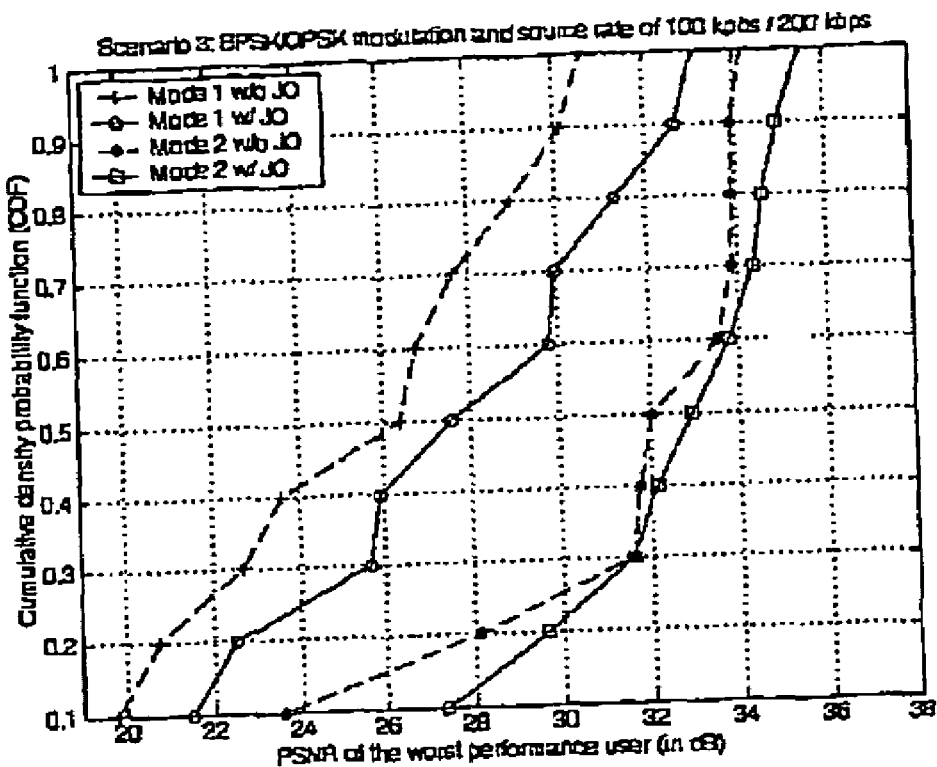
FIG. 13 shows performance comparison for scenario 3.
FIG. 14 shows a performance improvement comparison of the 3 investigated scenarios.

Therefore, the cross-layer optimizer chooses the parameter tuple that minimizes the maximum of MSE (or equivalently maximizes the minimum of the PSNR) among the users. In the simulation, it is assumed that the data packet size at the radio link layer is equal to 54 bytes, which is the same as the specified packet size of the IEEE802.11a or HiperLAN2 standard. The channel coherence time is assumed to be 50 ms for all the three users, which approximately corresponds to a pedestrian speed (for 5 GHz carrier frequency). Since the transmission data rate is influenced by the modulation scheme, the channel coding, and the multi-user scheduling, two different modulations (BPSK and QPSK) are assumed and it is further assumed that there are 7 cases of time arrangement in a time-division multiplexing based multi-user scheduling as shown in FIG. 6a. A user's transmission data rate is assumed to be equal to 100 kbps when BPSK is used and ⅔ of the total transmission time is assigned to it. Therefore, if QPSK is used and ⅘ of the total transmission time is assigned, the user can have a transmission data rate as high as 400 kbps. The transmission error rate on the other hand depends on the transmission data rate, the average SNR and the error correcting capability of the channel code. Usually, the performance of a channel code is evaluated in terms of the residual error rate (after channel decoding) for a given receive SNR. In our simulation, we assume a convolutional code of code rate ½ and a data packet size of 54 bytes. The residual packet error rate is shown in FIG. 10 as a function of SNR. However, in the wireless link, the receive SNR is not constant, but fluctuating around the mean value (long term SNR), which is due to fast fading caused by user mobility. In this way, the receive SNR can be modeled as a random variable with a certain probability distribution, which is determined by the propagation property of the physical channel (e.g., Rayleigh distribution, Rice distribution). The residual packet error rate in a fading wireless link is computed by averaging this packet error ratio (e.g., from FIG. 10) with the fading statistics. Assuming Rayleigh fading, the resulting average packet error rate is given in FIG. 11 as a function of the average signal-to-noise ratio (SNR). This resulting average packet error rate is used as the parameter e in our simulation. User position dependent path loss and shadowing commonly observed in wireless links are taken into account by choosing the long-term average signal-to-noise ratio randomly and independently for each user uniformly within the range from 1 to 100 (0 dB to 20 dB). On the application layer, it is assumed that the video is encoded using the emerging H.264 video compression standard with 15 frames per GOP (per 0.5 second). Two different values of the source rate (100 kbps and 200 kbps) are considered. This means that the video has been pre-encoded at two different target rates and both versions are stored on the streaming server. We can switch from one source stream to the other at the beginning of a GOP. In each GOP, the first frame is an I-frame and the following 14 frames are P-frames. We use the measured distortion profile of a particular lost frame and the encoding distortion for the 3 requested videos. FIG. 9 shows an example of a distortion profile in terms of MSE for a GOP at a source rate of 100 kbps. The MSE is measured between the displayed and the original video sequence and averaged across a GOP. In FIG. 9, the index indicates the loss of a particular frame. It is assumed that all following frames of the GOP become not decodable and the most recent correctly decoded frame is displayed instead of the non-decoded frames. Note that the index 16 gives the MSE when all frames are received correctly, which is the encoding distortion. Also, note that since successful decoding of P-frames depends on error-free reception of all previous frames of the same GOP, losing the first frame of a GOP leads to the largest distortion, while losing the last frame of a GOP leads to little distortion. Furthermore, it is assumed that each video frame (or picture) is packetized with maximum size of 54 bytes and each packet only contains data from one frame. That is, each frame is packetized into an integer number of packets. The size of each frame is determined during the encoding step. These values are stored along with the bit stream and the distortion profile. FIG. 6b gives the size (in terms of packets) for a GOP in the three measured videos at a source rate of 100 kbps, where I and Pn (n=1, 2 . . . 14) denote the I-frame and the n-th P frame, respectively. We can see that the size of an I-frame is much larger than that of a P-frame and the size of a P-frame varies from frame to frame. This is related to the contents of a video. Both, an operation mode without ARQ (referred to as Forward Mode) and an operation mode with ARQ (referred to as ARQ Mode) are investigated. We consider every GOP as a unit and assume that each GOP has to be transmitted within the duration of 0.5 second. In Forward Mode, we assume no acknowledgement from the clients is available and the video frames of every GOP for a particular client are repeatedly transmitted when the transmission data rate is larger than the source data rate. For instance, every GOP is transmitted twice if the transmission data rate is twice as large as the source data rate. If the transmission data rate is 1.5 times the source data rate, a GOP is transmitted once followed by retransmitting the I-frame, the first P-frame, the second P-frame, etc., until the period of 0.5 second for the GOP is expired. On the other hand, in ARQ Mode, we assume that instantaneous acknowledgement of a transmitted packet is available from the clients and the data packets of every GOP for a particular client are retransmitted in the way that the data packets in a GOP are received successfully in time order. That is, before transmitting anew packet, it is guaranteed that its previous packets in the GOP are received correctly. FIG. 12 to FIG. 14 provide simulation results of three scenarios (scenario 1, 2, and 3). In scenario 1, we restrict that only BPSK modulation is used at the radio link layer and only the source rate with 100 kbps is available at the application layer. Therefore, only one constant abstracted parameter tuple (with 100 kbps for all 3 users) is provided by the application layer in this scenario, while the radio link layer provides 7 abstracted parameter tuples, which results from the 7 cases of time arrangement shown in FIG. 6a. The cross-layer optimizer selects one out of the 7 combinations of the input parameter tuples such that our objective function is optimized. The MSE is a random variable controlled by the two factors discussed above, namely fast fading and user position dependent path loss and shadowing. In general, fast fading takes place in a much smaller timescale than the path loss and shadowing. In this paper, we evaluate the MSE averaged over fast fading by taking the expected value of the MSE with respect to the fast fading for a particular position of the users or equivalently for a particular long term SNR. Based on this value the cross-layer optimizer makes its decision. We also look at its statistical properties for an ensemble of user positions. Therefore, the cumulative density probability function (CDF) of this average MSE is chosen to show the performance of both modes (Forward Mode and ARQ Mode). The performance of the worst performing user in the system with the inventive joint optimization (w/ JO) is compared with that in a system without joint optimization (w/o JO). A system without joint optimization is assumed to assign the same amount of transmission time to all the users (i.e., Case1 in FIG. 6a) and use BPSK modulation, while the source data rate is fixed to 100 kbps. It can be seen from FIG. 12 that the PSNR of the worst performing user improves significantly in the system w/ JO. For instance, there is about 1-40%=60% of the chance that the PSNR of the worst performing user is larger than 30 ds in the system w/ JO in Forward Mode, which improves 2 dB when compared to the system w/o JO.A similar trend of improvement can be observed in FIG. 13 and FIG. 14 for scenario 2 and 3. In scenario 2, the same abstracted parameter tuple as in scenario 1 is assumed at the application layer but the radio link layer provides 14 abstracted parameter tuples, which result from the 7 cases of time arrangement with BPSK and another 7 cases of time arrangement with QPSK. The same system without joint optimization (w/o JO) as described in FIG. 12 is also provided for the purpose of comparison. In scenario 3, it is assumed that the two different source rates of 100 kbps and 200 kbps for each of the 3 users are provided by the application layer (resulting in 23=8 parameter tuples). The same abstracted parameter tuples as in scenario 2 are provided by the radio link layer. The performance improves when more abstracted parameter tuples are provided because more degrees of freedom can be obtained. This can be observed in FIG. 9 more clearly, where the performance improvement of the investigated 3 scenarios is shown. Here, PSNR is defined as the difference between the PSNR of the worst performing user in the system w/ JO and that in the system w/o JO. A close observation of the left hand side Fig. in FIG. 9 reveals that the amount of performance improvement of scenario 2 is much larger than that of scenario 1 in Forward Mode, while the amount of performance improvement of scenario 3 is only slightly larger than that of scenario 2. This indicates that the choice of higher transmission data rate (by using QPSK) provided by the radio link layer is favourable in this application mode and the optimizer chooses it frequently. In contract, the choice of higher source rate (200 kbps) provided by the application layer is not so favourable in this mode and the optimizer seldom chooses it. On the other hand, this choice of higher source rate is favourable in ARQ Mode, which can be seen from the graph on the right hand side, where the amount of performance improvement of scenario 3 is fairly larger than that of scenario 2. Therefore, choosing a suitable set of abstracted parameters tuples is important in order to obtain large performance improvements while optimizing at low complexity. Also, the experiments show that it is important to identify all degrees of freedom that are available on the individual layers and to consider the important ones in the cross-layer design.

The present invention provides an architecture for the joint optimization of application layer and radio link layer in a wireless system with a video streaming service. This architecture is based on three principle concepts, namely parameter abstraction, cross-layer optimization, and decision distribution. Our preliminary study reveals that the inventive architecture can provide a potential way to improve the performance and therefore help dealing with the future challenge in wireless multimedia communication. Even when considering a small number of degrees of freedom of the application layer and the radio link layer, we obtain significant improvements in user-perceived quality of our streaming video application by joint optimization.

Depending on certain implementation requirements of the inventive methods, the implementation can be performed using a digital storage medium, in particular a disc or a CD having electronically readable control signals stored thereon, which can cooperate with a programmable computer system such that the inventive methods are performed. Generally, the present invention is therefore a computer program product with a program code stored on a machine-readable digital storage medium, the program code performing the inventive methods, when the computer program product runs on a computer. In other words, the inventive methods are, therefore, a computer program having a program code for performing the inventive methods, when the computer program runs on a computer.

While this invention has been described in terms of several preferred embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

What is claimed is:

1. An apparatus for controlling an operation of a plurality of communication layers of a layered communication system, wherein the communication layers comprise OSI model layers, the layered communication system transmitting information through a communication channel,
   wherein an operation mode of a first communication layer of the plurality of communication layers is determined by a first set of parameters, and
   wherein an operation mode of a second communication layer, distinct from said first communication layer, of the plurality of communication layers is determined by a second set of parameters the apparatus comprising:
   a communication channel property provider;
   an extractor for extracting the first set of parameters of the first communication layer and the second set of parameters of the second communication layer to determine current statuses of the first and second communication layer;
   an abstraction model provider for providing a first abstraction model and a second abstraction model, wherein each abstraction model causes a parameter abstraction to transform the first and second sets of parameters into first and second key parameters comprehensible for a cross-layer optimizer;
   a determiner comprising the cross-layer optimizer, wherein the cross-layer optimizer jointly determines an optimized first set of parameters to be used by the first communication layer and an optimized second set of parameters to be used by the second communication layer, the first and second sets of parameters being optimized across the first communication layer and the second communication layer based on the first and second key parameters, the channel property and an optimization goal; and
   an optimized parameter provider for providing the optimized first set of parameters to the first communication layer and the optimized second set of parameters to the second communication layers,
   wherein the plurality of communication layers of the layered communication system are protocol layers,
   wherein the second communication layer is operative for managing a transmission of the information through the communication channel and for extracting the property of the communication channel,
   wherein the provider for providing the property of the communication channel is coupled to the second communication layer for receiving the property of the communication channel.

2. The apparatus in accordance with claim 1, wherein the second communication layer comprises a physical layer,
   wherein the provider for providing the property of the communication channel comprises a protocol interface for interfacing with the physical layer.

3. The apparatus in accordance with claim 1, wherein the provider for providing the property of the communication channel is operative for providing
   a bit error probability or/and
   a channel data rate associated with the bit error probability or/and
   a transmission delay or/and a transmission power associated with the bit error probability or/and a channel coherence time or/and a channel coherence band width as the property of the communication channel.

4. The apparatus in accordance with claim 1, wherein the first abstraction model comprises a first state diagram having a state and a further state and a transition between the states, wherein the second abstraction model comprises a second state diagram having a state and a further state and a transition between the states, wherein the first state diagram models a parameter dependent behavior of the first communication layer, and wherein the second state diagram models a parameter dependent behavior of the second communication layer, wherein the determiner for determining is operative for inserting the first set of parameters into the first abstraction model, the second set of parameters into the second abstraction model and to determine the first optimized set of parameters and the second optimized set of parameters to achieve the optimization goal by jointly emulating the first abstraction model and the second abstraction model in dependence of the channel property.

5. The apparatus in accordance with claim 4, wherein the determiner for determining comprises an analyzer for analyzing the first abstraction model using the first set of parameters and a second abstraction model using the second set of parameters in dependence of the channel property for signaling that the optimized first set of parameters or/and the optimized second set of parameters are to be determined, when the optimization goal cannot be achieved using the first set of parameters and the second set of parameters.

6. The apparatus in accordance with claim 1, wherein the optimization goal comprises an optimization of transmission quality, wherein the determiner for determining is operative for jointly determining the optimized first set of parameters and the optimized second set of parameters by emulating a behavior of the first communication layer using the first abstraction model and a behavior of the second communication layer using the second abstraction model, wherein the first set of parameters and the second set of parameters are initial parameters.

7. The apparatus in accordance with claim 6, wherein the first communication layer is operative for encoding the information to provide an information signal having an information rate associated with a distortion, and wherein the first communication layer is operative for encoding the information signal to obtain a transmit signal for transmission, the transmit signal having a data rate associated with a bit error probability, wherein the determiner for determining is operative for jointly determining the optimized first set of parameters to be used for encoding the information to obtain the information signal having the information rate associated with the distortion and the optimized second set of parameters to be used for encoding the information signal to obtain the transmit signal having the data rate supporting the information rate.

8. The apparatus in accordance with claim 1, wherein the information comprises a first information associated with a first user and a second information associated with a second user in a multi user scenario, wherein the optimization goal is an optimized transmission quality for the first information and for the second information, wherein the first communication layer is operative for encoding the first information to obtain a first information signal and for encoding the second information to obtain a second information signal, wherein the second communication layer is operative for encoding the first information signal and the second information signal to obtain a composite signal to be transmitted through the communication channel, wherein the determiner for determining is operative for jointly determining the optimized first set of parameters to be used by the first communication layer for encoding the first information and the second information and the optimized second set of parameters to be used by the second communication layer for encoding the first information signal and the second information signal to optimize the transmission quality of the first information and of the second information.

9. The apparatus in accordance with claim 8, wherein the second communication layer is operative for scheduling the first information signal and the second information signal, so that the first information signal is transmitted within a first time frame and the second information signal is transmitted within a second time frame, wherein the determiner for determining is operative for determining the optimized first set of parameters to obtain the first information signal having a first information rate associated with a first distortion and to obtain the second information signal having a second information rate associated with a second distortion, and for determining a second set of parameters to obtain the composite signal having a data rate supporting the first information rate and the second information rate.

10. The apparatus in accordance with claim 8, wherein the first information is associated with the first user comprises a first subinformation and a second subinformation, wherein the determiner for determining is further operative for determining the first optimized set of parameters to be used by the first communication layer for selectively encoding the first subinformation and the second subinformation to obtain the first information signal comprising the first and the second subinformation.

11. The apparatus in accordance with claim 10, wherein the determiner for determining is operative for determining the optimized first set of parameters for scheduling the first subinformation and the second subinformation within the first information signal, so that the first subinformation and the second subinformation are placed at different positions in the first information signal.

12. The apparatus in accordance with claim 1, wherein the determiner for determining is operative for monitoring a current status of the first communication layer determined by a first set of coefficients, and a current status of the second communication layer determined by a second set of coefficients to provide a status information.

13. The apparatus in accordance with claim 12, wherein the determiner for determining is operative for deciding on the basis of the status information, which optimized set of parameters is to be determined to achieve the optimization goal.

14. The apparatus in accordance with claim 1, wherein the optimization goal comprises the optimization of the transmission quality in a multi user scenario, wherein the information comprises a first information associated with a first user and a second information associated with the first user, a third information associated with a second user and a fourth information associated with the second user, wherein the first communication layer is operative for scheduling the first information and the second information to obtain a first information signal associated with the first user and wherein the first communication layer is operative for scheduling the third information and the fourth information to obtain a second information signal associated with the second user, wherein the second communication layer is operative for scheduling the first information signal and the second information signal to obtain a scheduled multi user stream, wherein the determiner for determining is operative for jointly determining the optimized first set of parameters to be used by the first communication layer to provide the first information signal and the second information signal, and to provide the optimized second set of parameters to be used by the second communication layer to provide the scheduled multi user stream.

15. The apparatus in accordance with claim 1, wherein the provider for providing the first abstraction model and the second abstraction model is operative for providing a plurality of abstraction models for a plurality of communication layers.

16. The apparatus in accordance with claim 1, wherein the provider for providing the optimized first set of parameters and the optimized second set of parameters comprises a protocol interface for interfacing with the first communication layer and with the second communication layer.

17. The apparatus in accordance with claim 1, wherein the second communication layer comprises a physical layer being operative for modulation, wherein the second set of parameters comprises a subset of modulation parameters determining a modulation scheme, wherein the determiner for determining is further operative for determining a further subset of modulation parameters to achieve the optimization goal.

18. The apparatus in accordance with claim 1, wherein the second communication layer comprises a data link layer being operative for forward error encoding using a subset of encoding parameters determining a forward error encoding scheme, wherein the determiner for determining is further operative to determine the subset of encoding parameters to achieve the optimization goal.

19. A communication apparatus for processing an information to be transmitted in accordance with a transmission protocol, the transmission protocol comprising a plurality of protocol layers, comprising:

an information source for providing the information;

an apparatus for controlling an operation of a plurality of communication layers of a layered communication system, wherein the communication layers comprise OSI model layers, the layered communication system transmitting information through a communication channel, wherein an operation mode of a first communication layer of the plurality of communication layers is determined by a first set of parameters, and wherein an operation mode of a second communication layer, distinct from said first communication layer, of the plurality of communication layers is determined by a second set of parameters, the apparatus comprising:

a communication channel property provider;

an extractor for extracting the first set of parameters of the first communication layer and the second set of parameters of the second communication layer to determine current statuses of the first and second communication layer;

an abstraction model provider for providing a first abstraction model and a second abstraction model, wherein the first abstraction model models a characteristic of each communication layer, which depends on the first set of parameters, and wherein the second abstraction model causes a parameter abstraction to transform the first and second sets of parameters into first and second key parameters comprehensible for a cross-layer optimizer;

wherein the cross-layer optimizer jointly determines an optimized first set of parameters to be used by the first communication layer and an optimized second set of parameters to be used by the second communication layer, the first and second sets of parameters being optimized across the first communication layer and the second communication layer based on the first and second key parameters, the channel property and an optimization goal;

an optimized parameter provider for providing the optimized first set of parameters to the first communication layer and the optimized second set of parameters to the second communication layer, wherein the plurality of communication layers of the layered communication system are protocol layers, wherein the second communication layer is operative for managing a transmission of the information through the communication channel and for extracting the property of the communication channel, wherein the provider for providing the property of the communication channel is coupled to the second communication layer for receiving the property of the communication channel; and a processor for processing the information in accordance with the protocol layers.

20. A method for controlling an operation of a plurality of communication layers of a layered communication system, wherein the communication layers comprise OSI model layers, the layered communication system transmitting information through a communication channel, wherein an operation mode of a first communication layer of the plurality of communication layers is determined by a first set of parameters, and wherein an operation mode of a second communication layer, distinct from said first communication layer, of the plurality of communication layers is determined by a second set of parameters, the method comprising the following steps of:

providing a property of the communication channel;

extracting the first set of parameters of the first communication layer and the second set of parameters of the second communication layer to determine current statuses of the first and second communication layers;

providing a first abstraction model and a second abstraction model, wherein each abstraction model causes a parameter abstraction to transform the first and second sets of parameters into first and second key parameters comprehensible for a cross-layer optimizer;

jointly determining by the cross-layer optimizer an optimized first set of parameters to be used by the first communication layer and an optimized second set of parameters to be used by the second communication layer, the first and second sets of parameters being optimized across the first communication layer and the second communication layer based on the first and second key parameters, the channel property and an optimization goal; and providing the optimized first set of parameters to the first communication layer and the optimized second set of parameters to the second communication layer, wherein the plurality of communication layers of the layered communication system are protocol layers, wherein the second communication layer manages a transmission of the information through the communication channel and extracts the property of the communication channel, wherein the property of the communication channel is provided by the second communication layer.

21. A method for processing an information to be transmitted in accordance with a transmission protocol, the transmission protocol comprising a plurality of protocol layers of a layered communication system, wherein the communication layers comprise OSI model layers, the layered communication system transmitting information through a communication channel, wherein an operation mode of a first protocol layer of the plurality of protocol layers is determined by a first set of parameters, and wherein an operation mode of a second protocol layer, distinct from said first communication layer, of the plurality of protocol layers is determined by a second set of parameters, the method comprising the following steps of:

providing the information;

controlling the plurality of protocol layers by providing a property of the communication channel;

extracting the first set of parameters of the first protocol layer and the second set of parameters of the second protocol layer to determine current statuses of the first and second protocol layers;

providing a first abstraction model and a second abstraction model, wherein each abstraction model causes a parameter abstraction to transform the first and second sets of parameters into first and second key parameters comprehensible for a cross-layer optimizer;

jointly determining by the cross-layer optimizer an optimized first set of parameters to be used by the first protocol layer and an optimized second set of parameters to be used by the second protocol layer, the first and second sets of parameters being optimized across the first communication layer and the second communication layer based on the first and second key parameters, the channel property and an optimization goal; and providing the optimized first set of parameters to the first protocol layer and the optimized second set of parameters to the second protocol layer, wherein the plurality of communication layers of the layered communication system are protocol layers, wherein the second communication layer manages a transmission of the information through the communication channel and extracts the property of the communication channel, wherein the property of the communication channel is provided by the second communication layer; and processing the information in accordance with the protocol layers.

22. A computer program stored on a computer-readable medium and executed by a computer, said computer program having a program code for performing a method for controlling an operation of a plurality of communication layers of a layered communication system, wherein the communication layers comprise OSI model layers, the layered communication system transmitting information through a communication channel, wherein an operation mode of a first communication layer of the plurality of communication layers is determined by a first set of parameters, and wherein an operation mode of a second communication layer, distinct from said first communication layer, of the plurality of communication layers is determined by a second set of parameters the method comprising the following steps of:

providing a property of the communication channel;

extracting the first set of parameters of the first communication layer and the second set of parameters of the second communication layer to determine current statuses of the first and second communication layers;

providing a first abstraction model and a second abstraction model, wherein each abstraction model causes a parameter abstraction to transform the first and second sets of parameters into first and second key parameters comprehensible for a cross-layer optimizer;

jointly determining by the cross-layer optimizer an optimized first set of parameters to be used by the first communication layer and an optimized second set of parameters to be used by the second communication layer, the first and second sets of parameters being optimized across the first communication layer and the second communication layer based on the first and second key parameters, the channel property and an optimization goal; and providing the optimized first set of parameters to the first communication layer and the optimized second set of parameters to the second communication layer, when the program runs on a computer, wherein the plurality of communication layers of the layered communication system are protocol layers, wherein the second communication layer manacles a transmission of the information through the communication channel and extracts the property of the communication channel, wherein the property of the communication channel is provided by the second communication layer.

23. The apparatus in accordance with claim 1, wherein: the first abstraction model causes a first communication layer parameter abstraction to define a plurality of first key parameters being described by one or more parameters of said first set of parameters; and the second abstraction model causes a second communication layer parameter abstraction to define a plurality of second key parameters being described by one or more parameters of said second set of parameters.

24. The communication apparatus in accordance with claim 19, wherein: the first abstraction model causes a first communication layer parameter abstraction to define a plurality of first key parameters being described by one or more parameters of said first set of parameters; and the second abstraction model causes a second communication layer parameter abstraction to define a plurality of second key parameters being described by one or more parameters of said second set of parameters.

25. The method in accordance with claim 20, wherein: the first abstraction model causes a first communication layer parameter abstraction to define a plurality of first key parameters being described by one or more parameters of said first set of parameters; and the second abstraction model causes a second communication layer parameter abstraction to define a plurality of second key parameters being described by one or more parameters of said second set of parameters.

26. The method in accordance with claim 21, wherein: the first abstraction model causes a first communication layer parameter abstraction to define a plurality of first key parameters being described by one or more parameters of said first set of parameters; and the second abstraction model causes a second communication layer parameter abstraction to define a plurality of second key parameters being described by one or more parameters of said second set of parameters.

27. The computer program in accordance with claim 22, wherein: the first abstraction model causes a first communication layer parameter abstraction to define a plurality of first key parameters being described by one or more parameters of said first set of parameters; and the second abstraction model causes a second communication layer parameter abstraction to define a plurality of second key parameters being described by one or more parameters of said second set of parameters.

\* \* \* \* \*

UNITED STATES PATENT AND TRADEMARK OFFICE
CERTIFICATE OF CORRECTION

PATENT NO. : 7,656,815 B2 Page 1 of 1
APPLICATION NO. : 11/404533
DATED : February 2, 2010
INVENTOR(S) : Kellerer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 566 days.

Signed and Sealed this

Thirtieth Day of November, 2010

David J. Kappos
*Director of the United States Patent and Trademark Office*